United States Patent
Molev Shteiman et al.

(10) Patent No.: US 9,800,384 B2
(45) Date of Patent: Oct. 24, 2017

(54) SYSTEM AND METHOD FOR MULTI-SOURCE CHANNEL ESTIMATION

(71) Applicant: Futurewei Technologies, Inc., Plano, TX (US)

(72) Inventors: Arkady Molev Shteiman, Bridgewater, NJ (US); Xiao Feng Qi, Westfield, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 14/944,013

(22) Filed: Nov. 17, 2015

(65) Prior Publication Data
US 2017/0141902 A1    May 18, 2017

(51) Int. Cl.
*H04L 5/00* (2006.01)
*H04B 7/0413* (2017.01)
*H04W 16/28* (2009.01)

(52) U.S. Cl.
CPC ......... *H04L 5/0053* (2013.01); *H04B 7/0413* (2013.01); *H04L 5/0007* (2013.01); *H04W 16/28* (2013.01)

(58) Field of Classification Search
CPC ... H04L 5/0053; H04L 5/0007; H04B 7/0413; H04W 16/28
See application file for complete search history.

(56) References Cited

U.S. PATENT DOCUMENTS

| 6,349,119 B1* | 2/2002 | Sogabe | H04B 7/01 375/316 |
| 2005/0136943 A1* | 6/2005 | Banerjee | H04B 1/7115 455/456.1 |
| 2006/0072651 A1 | 4/2006 | Kent et al. | |

(Continued)

FOREIGN PATENT DOCUMENTS

| CN | 101795246 A | 8/2010 |
| CN | 102143101 A | 8/2011 |
| CN | 102308228 A | 1/2012 |

OTHER PUBLICATIONS

Dammann A., et al., "WHERE2 Location Aided Communications," Eurpoean Wireless, Guildford, UK, Apr. 16-18, 2013, pp. 1-8.

(Continued)

*Primary Examiner* — Janice Tieu
(74) *Attorney, Agent, or Firm* — Slater Matsil, LLP

(57) ABSTRACT

A method for channel estimation includes determining position information of a main transmission point with a primary transmission path to the communications device and of at least one mirror transmission point associated with the main transmission point by at least one secondary transmission path between the main transmission point and the communications device, estimating a primary channel between the main transmission point and the communications device and at least one secondary channel between the at least one mirror transmission point and the communications device in accordance with the position information of the main transmission point and of the at least one mirror transmission (Continued)

point and position information of antennas in an antenna array of the communications device, and instructing use of the estimated primary channel and the at least one estimated secondary channel.

23 Claims, 17 Drawing Sheets

(56) References Cited

U.S. PATENT DOCUMENTS

| | | |
|---|---|---|
| 2009/0029658 A1 | 1/2009 | Kwak et al. |
| 2012/0219093 A1 | 8/2012 | Jia et al. |
| 2013/0244689 A1* | 9/2013 | Keerthi .................. H04W 4/02 455/456.1 |
| 2013/0301563 A1 | 11/2013 | Gupta et al. |
| 2015/0355320 A1 | 12/2015 | Kim |

OTHER PUBLICATIONS

Di Taranto, R., et al., "Location-Aware Communications for 5G Networks," IEEE Signal Processing Magazine, Nov. 2014, pp. 102-112.

Guibene, W., et al., "Degrees of Freedom of Downlink Single- and Multi-Cell Multi-User MIMO Systems with Location Based CSIT," Vehicular Technology Conference, Jun. 5, 2013, pp. 1-5.

Larsson, E. G., et al., "Massive MIMO for Next Generation Wireless Systems," IEEE Communications Magazine, Feb. 2014, pp. 186-195.

Li, J., et al., "Joint Estimation of Channel Parameters for MIMO Communication Systems," Wireless Communications Systems, Sep. 7, 2005, pp. 22-26.

Li, J., et al., "Position Location of Mobile Terminal in Wirless MIMO Communications Systems," Journal of Communications and Networks, vol. 9, No. 3, Sep. 2007, pp. 254-264.

Rusek, F., et al., "Scaling Up MIMO," IEEE Signal Processing Magazine, Jan. 2013, pp. 40-60.

Slock, D., "MIMO Broadcast and Interference Channels with Location based Partial CSIT," European Wireless 2013, Apr. 16-18, 2013, Guildford, UkK, pp. 1-6.

Slock, D., "Location Aided Wireless Communications," Proceedings of the 5th International Symposium on Communications, Control and Signal Processing, ISCCSP 2012, Italy, Rome, May 2-4, 2012, 6 pages.

Ikegami, F., et al., "Theoretical Prediction of Mean Field Strength for Urban Mobile Radio," IEEE Transactions on Antennas and Propagation, vol. 39, No. 3, Mar. 1991, pp. 299-302.

Kimpe, M., et al., "Computerized indoor radio channel estimation using ray tracing," Ann. Télécommun., vol. 52, Issue 5, May 1997, abstract only, 5 pages.

Yang, N., "A New Method of MIMO-OFDM Channel Estimation," Value Engineering, China Academic Journal Electronic Publishing House, http://www.cnki.net, Dec. 31, 2012; pp. 190-191.

* cited by examiner

SYSTEM AND METHOD FOR MULTI-SOURCE CHANNEL ESTIMATION

TECHNICAL FIELD

The present disclosure relates generally to digital communications, and more particularly to a system and method for multi-source channel estimation.

BACKGROUND

In general, multiple input multiple output (MIMO) increases the capacity of a radio link through the use of multiple transmit antennas and multiple receive antennas. MIMO exploits multipath propagation to increase the capacity of the radio link. MIMO has proven to be effective at increasing the capacity of the radio link and has been accepted into a variety of technical standards, including WiFi or Wireless LAN: IEEE 802.11n, and IEEE 802.11ac; Evolved High-Speed Packet Access (HSPA+); Worldwide Interoperability for Microwave Access (WiMAX); and Third Generation Partnership Project (3GPP) Long Term Evolution (LTE) Advanced.

Increasing the number of transmit antennas and receive antennas from a relatively small number (on the order of 10 or fewer) to a significantly larger number (on the order of 100, 1000, 10000, or more) can lead to even greater increases in the capacity of the radio link. Such MIMO communications systems are referred to as large-scale MIMO communications systems.

Channel estimation is a complex and time intensive operation. Under the multi-path model, channel estimation is performed for every multi-path at each antenna and involves individually receiving reference signals transmitted over each multi-path for each transmitter-receiver pair. Therefore, at a MIMO communications device, such as a large scale MIMO communications device, the number of channel estimations can be very large. For example, in a 10000 antenna MIMO communications device with 3 multi-paths, there will be 30000 estimations even for a user equipped with a single antenna.

SUMMARY OF THE DISCLOSURE

Example embodiments provide a system and method for multi-source channel estimation.

In accordance with an example embodiment, a method for channel estimation is provided. The method includes determining, by a communications device, position information of a main transmission point with a primary transmission path to the communications device and of at least one mirror transmission point associated with the main transmission point by at least one secondary transmission path between the main transmission point and the communications device, estimating, by the communications device, a primary channel between the main transmission point and the communications device and at least one secondary channel between the at least one mirror transmission point and the communications device in accordance with the position information of the main transmission point and of the at least one mirror transmission point and position information of antennas in an antenna array of the communications device, and instructing, by the communications device, use of the estimated primary channel and the at least one estimated secondary channel.

In accordance with another example embodiment, a multiple input multiple output (MIMO) communications device is provided. The MIMO communications device includes an antenna array, a processor, and a computer readable storage medium storing programming for execution by the processor. The programming including instructions configuring the MIMO communications device to determine position information of a main transmission point with a primary transmission path to the MIMO communications device and of at least one mirror transmission point associated with the main transmission point by at least one secondary transmission path between the main transmission point and the MIMO communications device, to estimate a primary channel between the transmission point and the MIMO communications device and at least one secondary channel between the at least one mirror transmission point and the MIMO communications device in accordance with the position information of the main transmission point and of the at least one mirror transmission point and position information of antennas in the antenna array, and to instruct use of the estimated primary channel and the at least one estimated secondary channel.

In accordance with another example embodiment, a multiple input multiple output (MIMO) communications system is provided. The MIMO communications system includes a main transmission point, a positioning system configured to transmit orthogonal reference signals, and a MIMO communications device. The MIMO communications device includes an antenna array comprising a plurality of antenna units, a processor, and a computer readable storage medium storing programming for execution by the processor. The programming including instructions configuring the MIMO communications device to determining positional information of antennas of the antenna array in accordance with the orthogonal reference signals transmitted by the positioning system, to determine position information of the main transmission point with a primary transmission path to the MIMO communications device and of at least one mirror transmission point associated with the main transmission point by at least one secondary transmission path between the main transmission point and the MIMO communications device, to estimate a primary channel between the main transmission point and the MIMO communications device and at least one secondary channel between the at least one mirror transmission point and the MIMO communications device in accordance with the position information of the main transmission point and of the at least one mirror transmission point and the position information of antennas in the antenna array, to generate beamforming coefficients in accordance with the estimated primary channel and the at least one estimated secondary channel and the position information of the antennas in the antenna array, to provide the beamforming coefficients to the antennas in the antenna array, and to communicate with the main transmission point and of the at least one mirror transmission point using the antenna array.

Practice of the foregoing embodiments enables low complexity channel estimation in a large scale MIMO communications device by determining signal source positions and estimating the channels between the signal sources and individual antennas using positional information of the signal sources and the antennas.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the embodiments and ways to operate the embodiments disclosed herein, and do not limit the scope of the disclosure.

One embodiment relates to multi-source channel estimation. For example, a MIMO communications device determines position information of a main transmission point with a primary transmission path to the communications device and of at least one mirror transmission point associated with the main transmission point by at least one secondary transmission path between the main transmission point and the communications device, estimates a primary channel between the main transmission point and the communications device and at least one secondary channel between the at least one mirror transmission point and the communications device in accordance with the position information of the main transmission point and of the at least one mirror transmission point and position information of antennas in an antenna array of the communications device, and instructs use of the estimated primary channel and the at least one estimated secondary channel.

The embodiments will be described with respect to example embodiments in a specific context, namely MIMO communications systems that support very large scale beamforming with antenna arrays having large numbers of transmit antennas and receive antennas. The embodiments may be applied to standards compliant communications systems, such as those that are compliant with Third Generation Partnership Project (3GPP), IEEE 802.11, WiMAX, HSPA, and the like, technical standards, and non-standards compliant MIMO communications systems, that support beamforming with antenna arrays having very large numbers of transmit antennas and receive antennas.

Figure 1:
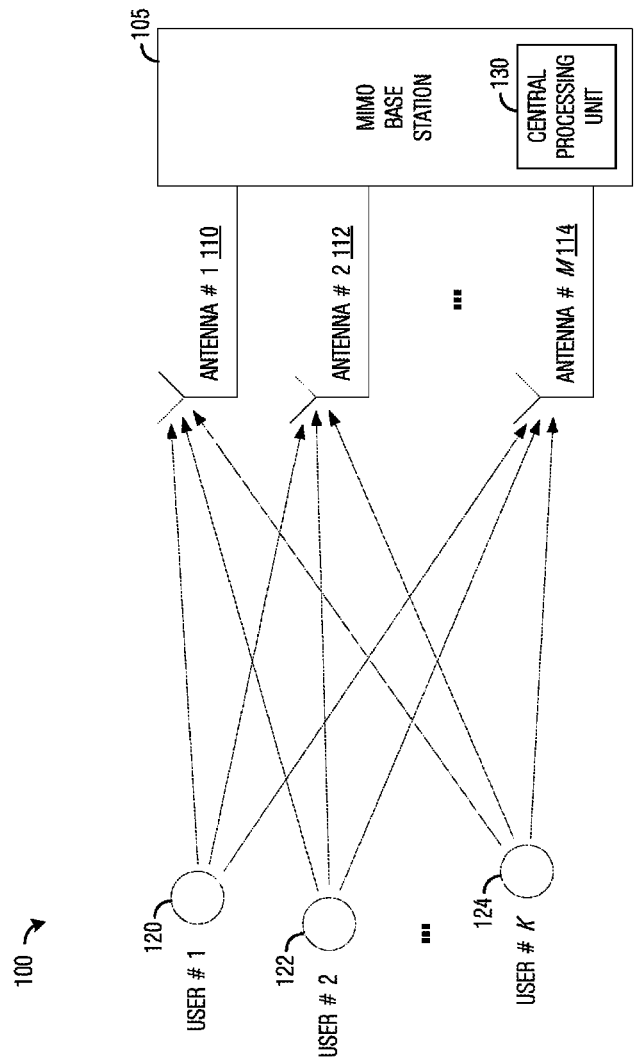
FIG. 1 illustrates an example communications system highlighting MIMO reception according to example embodiments described herein.

FIG. 1 illustrates an example communications system 100 highlighting MIMO reception. Communications system 100 includes a MIMO base station 105 serving K users, such as user #1 120, user #2 122, and user #K 124, where K is an integer number greater than or equal to 1. MIMO base station 105 includes M receive antennas, such as antenna #1 110, antenna #2 112, and antenna #M 114, where M is an integer number greater than or equal to 1. In a large scale MIMO implementation, M may be on the order of 100s, 1000s, 10000s, or even greater. A special case of large scale MIMO is referred to as massive MIMO. Massive MIMO may involve an extremely large number of antennas, 100000 or more. A base station may also be referred to as an access point, a NodeB, an evolved NodeB (eNB), a communications controller, and so on, while a user may also be referred to as a mobile station, a mobile, a terminal, a subscriber, a user equipment (UE), and so forth. MIMO base station 105 also includes a central processing unit 130 configured to estimate signals transmitted by the users and received by MIMO base station 105.

While it is understood that communications systems may employ multiple base stations capable of communicating with a number of users, only one base station, and a number of users are illustrated for simplicity.

In communications system 100, the K users share the same communications system resources (such as time-frequency resources). To simplify discussion, each user is equipped with only one antenna. However, the example embodiments presented herein are operable with users with any number of antennas. Each of the M receive antennas at MIMO base station 105 are equipped with its own radio frequency (RF) hardware (such as filters, amplifiers, mixers, modulators, demodulators, constellation mappers, constellation demappers, and the like), analog to digital (A/D) converters, digital to analog (D/A) converters, as well as a local processing unit that is capable of performing a limited amount of processing. The local processing unit, the antenna and the associated hardware may be referred to as an antenna unit (AU). The local processing unit is referred to herein as an AU processing unit.

Communications system 100 may be represented as a mathematical model expressible as:

$$\begin{bmatrix} y_1 \\ y_2 \\ \vdots \\ y_M \end{bmatrix} = \begin{bmatrix} a_{1,1} & a_{1,2} & \cdots & a_{1,K} \\ a_{2,1} & a_{2,2} & \cdots & a_{2,K} \\ \vdots & \vdots & & \vdots \\ a_{M,1} & a_{M,2} & \cdots & a_{M,K} \end{bmatrix} \cdot \begin{bmatrix} x_1 \\ x_2 \\ \vdots \\ x_K \end{bmatrix} + \begin{bmatrix} n_1 \\ n_2 \\ \vdots \\ n_M \end{bmatrix}$$

or $$Y = A \cdot X + N,$$

where X is a transmitted symbol vector of length K in which each element $x_k$ represents a data symbol associated with user k; Y is a received sample vector of length M in which each element $y_m$ represents a sample of receive antenna m; N is a receiver noise sample vector of length M in which each element $n_m$ represents the noise received on receive antenna m, it is assumed that N is additive white Gaussian noise (AWGN); A is a channel matrix of size M by K in which each element $a_{m,k}$ represents a channel transfer function between user k and receive antenna m; K is the number of users served by MIMO base station 105; and M is the number of receive antennas of MIMO base station 105. In general, a MIMO receiver has to resolve the above expression and given the received sample vector Y, find an estimate of the transmitted symbol vector X (denoted $\hat{X}$) that is as close as possible to the transmitted symbol vector X.

Figure 2:
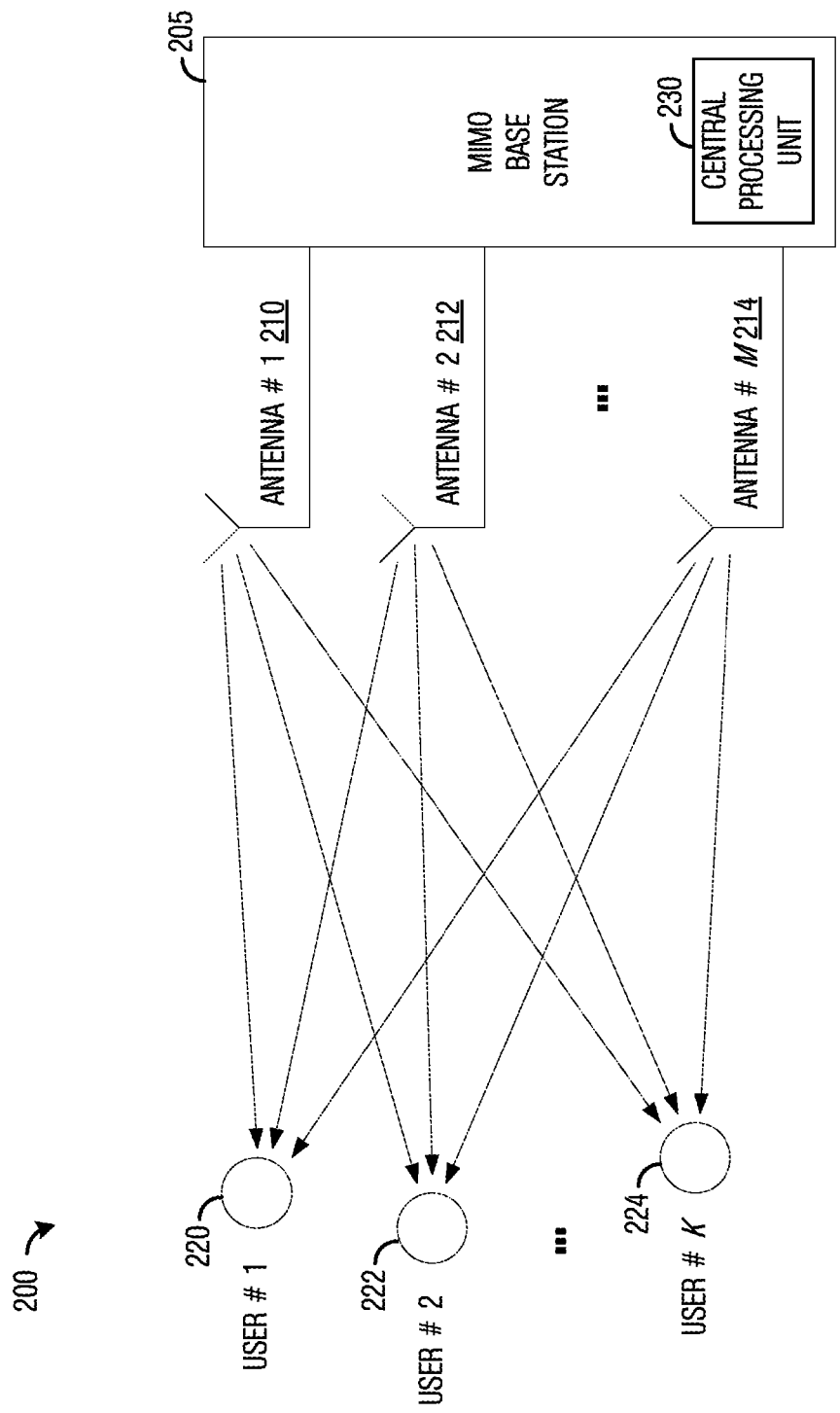
FIG. 2 illustrates an example communications system highlighting MIMO transmission according to example embodiments described herein.

FIG. 2 illustrates an example communications system 200 highlighting MIMO transmission. Communications system 200 includes a MIMO base station 205 serving K users, such as user #1 220, user #2 222, and user #K 224, where K is an integer number greater than or equal to 1. MIMO base station 205 includes M transmit antennas, such as antenna #1 210, antenna #2 212, and antenna #M 214, where M is an integer number greater than or equal to 2. In a large scale MIMO implementation, M may be on the order of 100s, 1000s, 10000s, or even greater. MIMO base station 205 also includes a central processing unit 230 configured to assist in precoding transmissions to the K users. Central processing unit 230 is also configured to assist in channel estimation.

Communications system 200 may be represented as a mathematical model expressible as:

$$\begin{bmatrix} r_1 \\ r_2 \\ \vdots \\ r_K \end{bmatrix} = \begin{bmatrix} a_{1,1} & a_{1,2} & \cdots & a_{1,M} \\ a_{2,1} & a_{2,2} & \cdots & a_{2,M} \\ \vdots & \vdots & & \vdots \\ a_{K,1} & a_{K,2} & \cdots & a_{K,M} \end{bmatrix} \cdot \begin{bmatrix} w_{1,1} & w_{1,2} & \cdots & w_{1,K} \\ w_{2,1} & w_{2,2} & \cdots & w_{2,K} \\ \vdots & \vdots & & \vdots \\ w_{M,1} & w_{M,2} & \cdots & w_{M,K} \end{bmatrix} \cdot \begin{bmatrix} x_1 \\ x_2 \\ \vdots \\ x_K \end{bmatrix}$$

or $$R = A \cdot W \cdot X + N,$$

where X is a transmitted symbol vector of length K in which each element $x_k$ represents a symbol of user k; R is a received sampled vector of length K in which each element $r_k$ represents a sample received by user k; N is a received noise vector of length K in which each element $n_k$ represents noise received by user k (it is assumed that N is AWGN); A is a channel matrix of size M by K in which each element $a_{m,k}$ represents the channel transfer function between user k and transmit antenna m; and W is a precoding matrix of size K by M.

As discussed previously, beamforming is a signal processing technique used for directional communications (signal transmission and/or reception). Beamforming involves combining antenna elements in such a way that some directions experience constructive interference while other directions experience destructive interference, therefore generating a communications beam in an intended direction. Therefore, in order to utilize beamforming, a communications device needs to obtain directional information regarding other communications devices with which it is communicating. From the directional information, the communications device may be able to generate antenna coefficients to generate communications beams directed towards the other communications devices.

In the far field, the distance between an antenna array of a large scale MIMO communications device and a UE are sufficiently large (generally, the distance between the large scale MIMO communications device and the UE is more than an order of magnitude greater than the dimensions of the antenna array) so that communications beams arriving at the antenna array from the UE are considered to be parallel. However, in the near field, the assumption of the parallel communications beams does not hold up since the distance between the large scale MIMO communications device and the UE is not so great.

Figure 3:
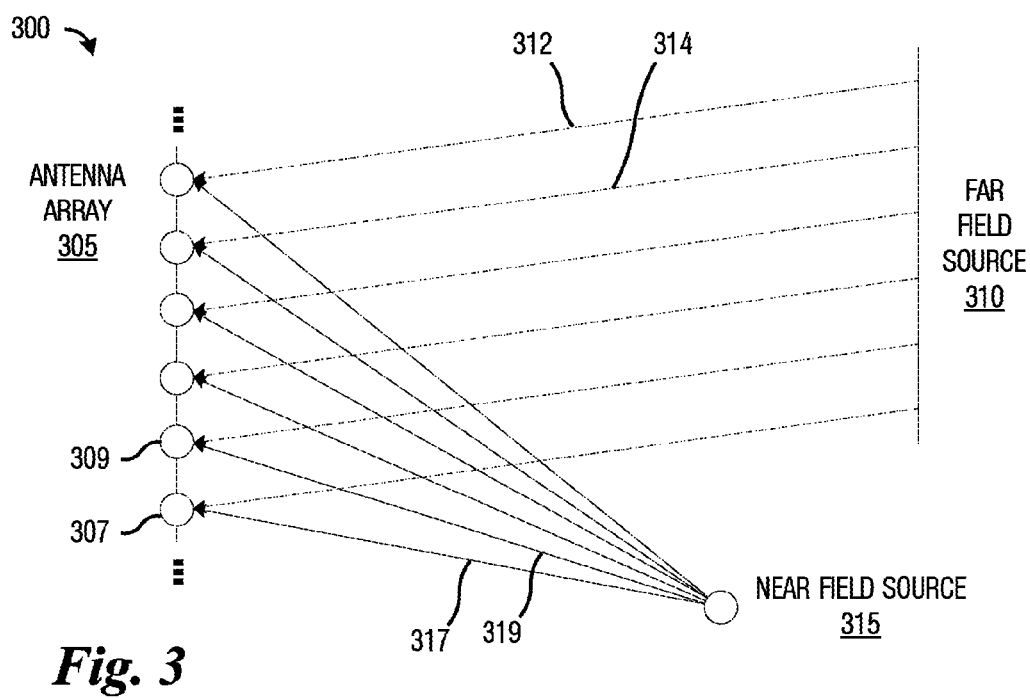
FIG. 3 illustrates an example communications system highlighting far field sources and near field sources according to example embodiments described herein.

FIG. 3 illustrates an example communications system 300 highlighting far field sources and near field sources. Communications system 300 includes an antenna array 305 that includes a plurality of antennas, such as antenna 307 and antenna 309. Communications system 300 also includes a far field source 310 and a near field source 315. Far field source 310 is located at least an order of magnitude further away from antenna array 305 than the dimensions of antenna array 305, while near field source 315 is located less than an order of magnitude of the dimensions of antenna array 305 away from antenna array 305.

Communications beams from far field source 310, such as communications beams 312 and 314, are parallel (or substantially parallel) as they arrive at antenna array 305. Since the communications beams are parallel, they have the same direction of arrival. On the other hand, communications beams from near field source 315, such as communications beams 317 and 319, are not parallel as they arrive at antenna array 305. Hence the directions of arrival of the communications beams from near field source 315 are different.

When a transmission is made from a transmission point (e.g., an AP in a downlink transmission or a UE in an uplink transmission) to a reception point (e.g., the UE in the downlink transmission or the AP in the uplink transmission), the transmission may take a primary path from the transmission point to the reception point. However, if there are objects in the vicinity of the transmission point and the reception point, the transmission may reflect off these objects and take secondary paths from the transmission point to the reception point. In general, a primary path is a direct path between a transmission point and a reception point. There are also secondary paths that involve the transmission reflecting off one or more surfaces after leaving the transmission point before arriving at the reception point. The transmissions taking the primary and secondary paths to the reception point may be referred to as multipath. The transmissions taking the secondary paths have greater delay than the transmissions taking the primary path due to the longer path. The transmissions on the secondary paths may be exploited to improve communications performance or they may be interference and degrade performance. Each of the paths (primary and secondary) may be modeled by using channel estimation techniques. However, when the reception point has a large scale MIMO antenna array, channel estimation may be computationally intensive since channel estimation is performed at each antenna for each path (primary and secondary).

Figure 4:
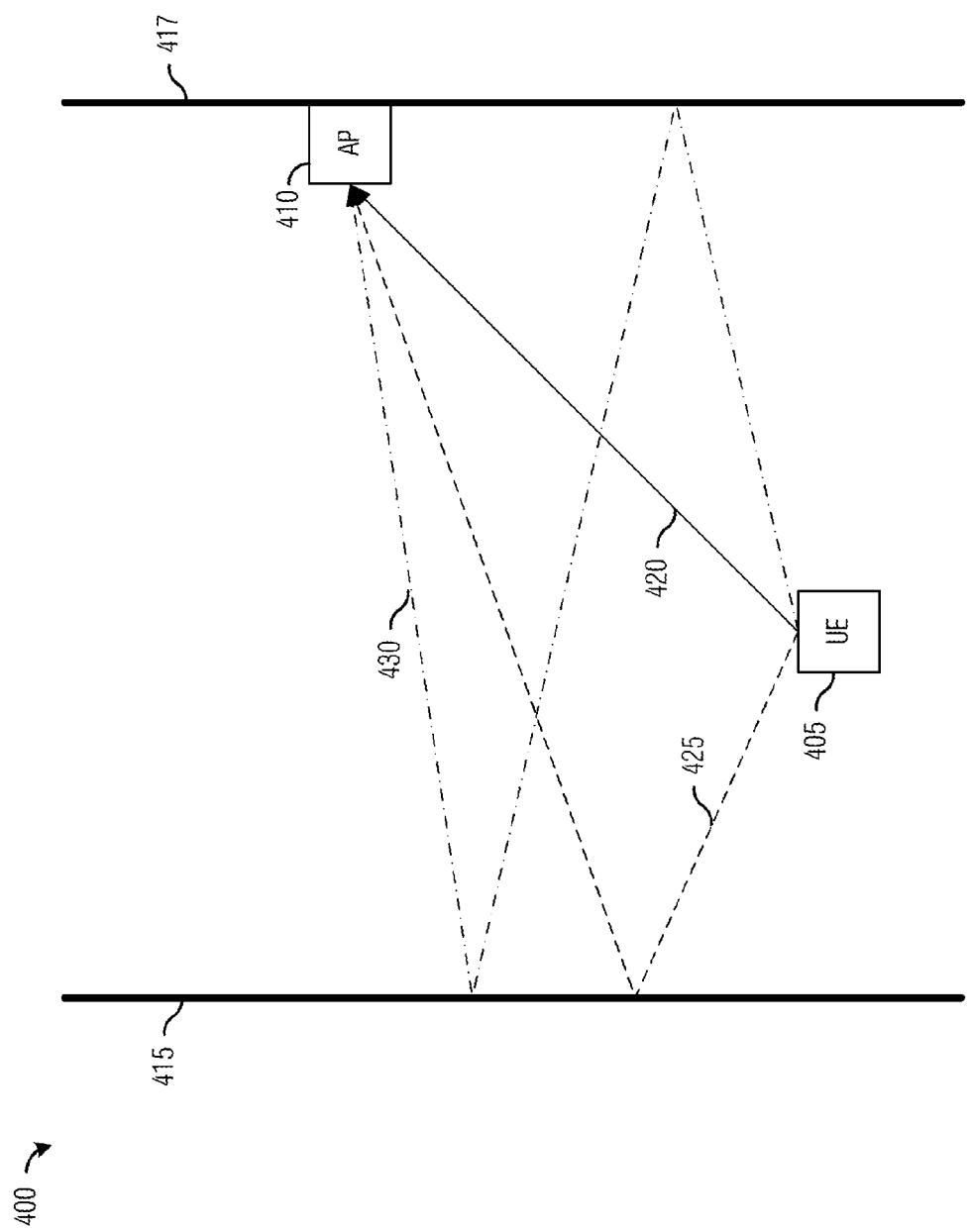
FIG. 4 illustrates an example communications system, highlighting primary and secondary paths according to example embodiments described herein.

FIG. 4 illustrates an example communications system 400, highlighting primary and secondary paths. Communications system 400 includes communicating devices, UE 405 and AP 410. As shown in FIG. 4, UE 405 is making an uplink transmission to AP 410. In other words, UE 405 is the transmission point and AP 410 is the reception point. Communications system 400 is deployed in between a first wall 415 and a second wall 417. As an example, communications system 400 is deployed indoors.

When UE 405 sends a transmission to AP 410, the transmission may follow a primary path 420. The transmission may also follow several secondary paths, such as first secondary path 425 where the transmission reflects off first wall 415 before arriving at AP 410, or a second secondary path 430 where the transmission reflects off second wall 417 and first wall 415 before arriving at AP 410. In general, when there are more objects in the vicinity of the communicating devices, the more paths there are between the communicating devices. However, depending on the type of objects involved, significant power is lost at each reflection. Therefore transmissions over paths comprising more than three or four reflections may be so low in power that they may not be significant and it is possible to ignore them.

According to an example embodiment, transmissions taking secondary paths are modeled as originating at mirror sources instead of originating at their main source and reflecting off intermediary objects. A transmission following a secondary path that includes one or more reflections may be modeled as originating at a mirror source and following a primary path rather than originating at the main source and following the secondary path.

Figure 5:
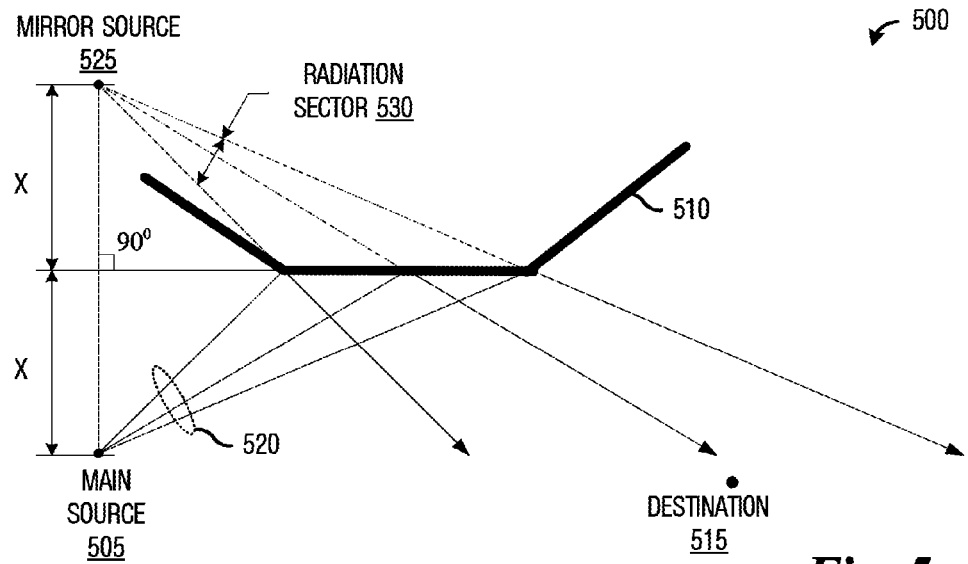
FIG. 5 illustrates an example communications system highlighting the modeling of a transmission following a secondary path and reflecting off a flat surface according to example embodiments described herein.

FIG. 5 illustrates an example communications system 500 highlighting the modeling of a transmission following a secondary path and reflecting off a flat surface. In communications system 500, a transmission originates at main source 505 and reflects off reflective surface 510 towards a destination 515. A range of transmissions 520 reflects off reflective surface 510 while maintaining an orientation towards destination 515. It is possible to model the transmissions reflecting off reflective surface 510 as originating at a mirror source 525. Transmissions from mirror source 525 pass through reflective surface 510 on towards destination 515. A radiation sector 530 corresponds to a range of transmission angles that correspond to range of transmissions 520. As shown in FIG. 5, secondary paths due to reflective surface 510 may be modeled as mirror source 525 that is symmetrical to main source 505 with respect to reflective surface 510. As the size of reflective surface 515 increases, the likelihood that multiple destinations will receive transmissions from mirror source 525 also increases.

Figure 6:
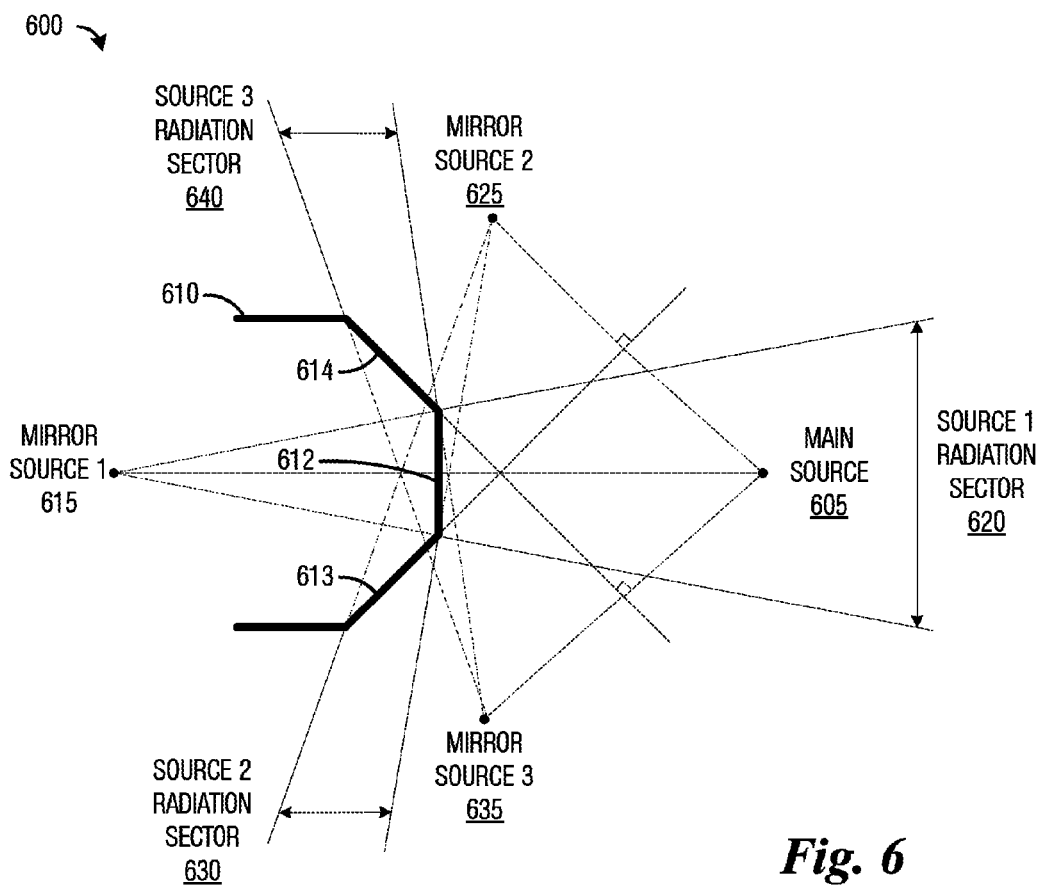
FIG. 6 illustrates an example communications system highlighting the modeling of a transmission following a secondary path and reflecting off a broken surface according to example embodiments described herein.

FIG. 6 illustrates an example communications system 600 highlighting the modeling of a transmission following a secondary path and reflecting off a broken surface. In communications system 600, a transmission originates at main source 605 and reflects off reflective surface 610. It is possible to model the transmissions reflecting off reflective surface 610 as originating at one of a plurality of mirror sources depending upon where on reflective surface 610 the transmission reflects. As an illustrative example, a transmission reflecting off a first sub-surface 612 may be modeled as originating at mirror source1 615 with a corresponding source1 radiation sector 620. Similarly, a transmission reflecting off a second sub-surface 613 may be modeled as originating at mirror source2 625 with a corresponding source2 radiation sector 630 and a transmission reflecting off a third sub-surface 614 may be modeled as originating at mirror source3 635 with a corresponding source3 radiation sector 640. Since the radiation sectors of mirror sources arising from the broken surface tends to be small, the likelihood that multiple destinations will receive transmissions reflecting off from the broken surface is small.

Figure 7:
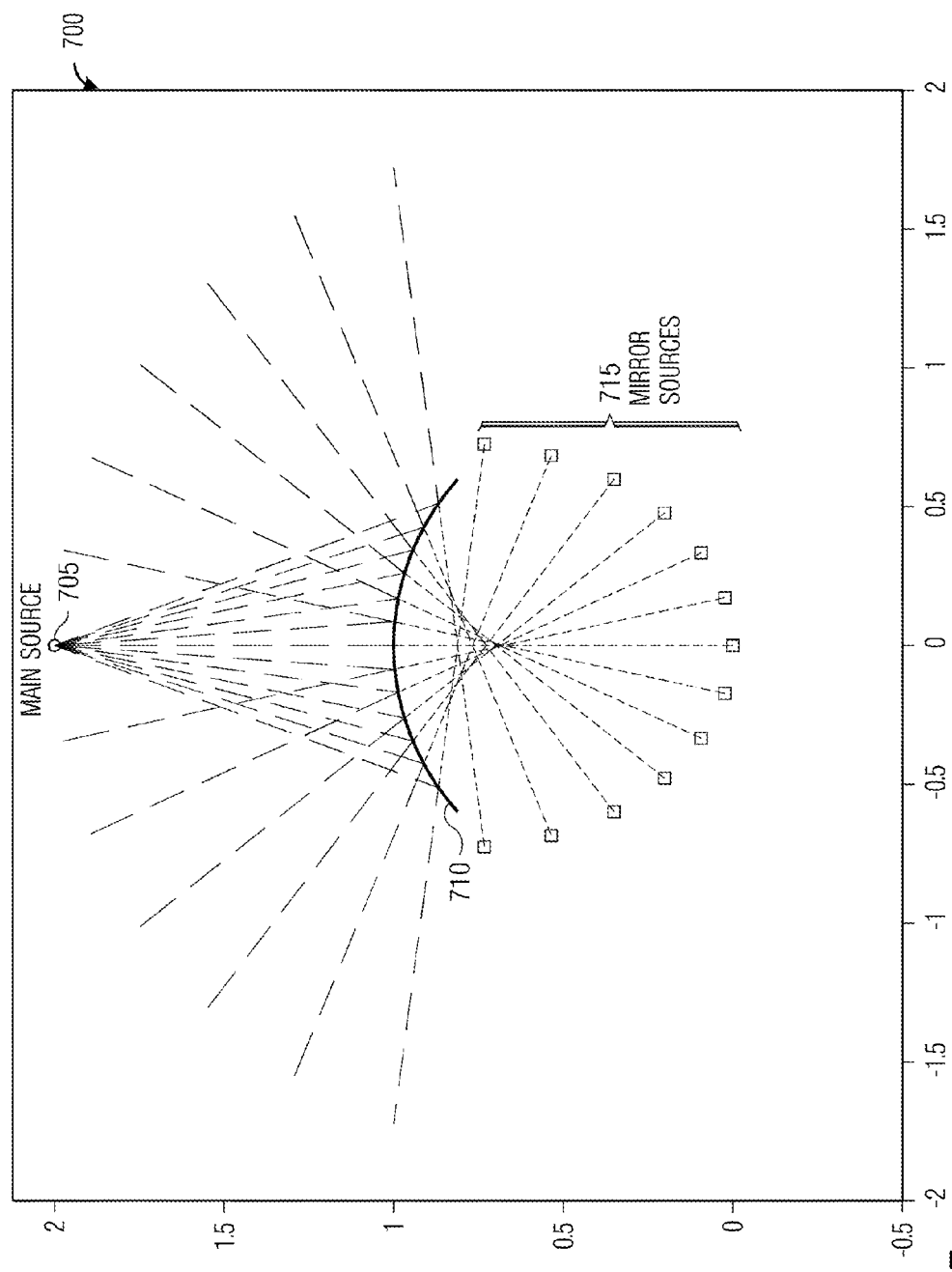
FIG. 7 illustrates an example communications system highlighting the modeling of a transmission following a secondary path and reflecting off a curved surface according to example embodiments described herein.

FIG. 7 illustrates an example communications system 700 highlighting the modeling of a transmission following a secondary path and reflecting off a curved surface. The curved surface may be modeled as an infinite number of small flat surfaces. In communications system 700, a transmission originates at main source 705 and reflects off reflective surface 710. It is possible to model the transmissions reflecting off reflective surface 710 as originating at one of a plurality of mirror sources (mirror sources 715) depending upon where on reflective surface 710 the transmission reflects. Since reflective surface 710 is modeled as an infinite number of small flat surfaces, the likelihood that multiple destinations will receive transmissions reflecting off the curved surface tends towards 0.

In general, the more flat surfaces with large surface area are present in a deployment of a communications system, the more mirror sources with wide radiation sectors are present, thereby leading to high likelihood that many destinations will receive transmissions reflecting off the flat surfaces. In a typical indoor deployment, there are large numbers of such surfaces, including walls, ceilings, roofs, doors, windows, screens, desks, pictures, appliances, furniture, and so on. These surfaces may provide multiple mirror sources that will be receivable by more destinations. Small objects, such as pictures, mirrors, and so forth, may add additional mirror sources while not be significantly large to split a main source with a large radiation sector into smaller radiation sectors.

Figure 8:
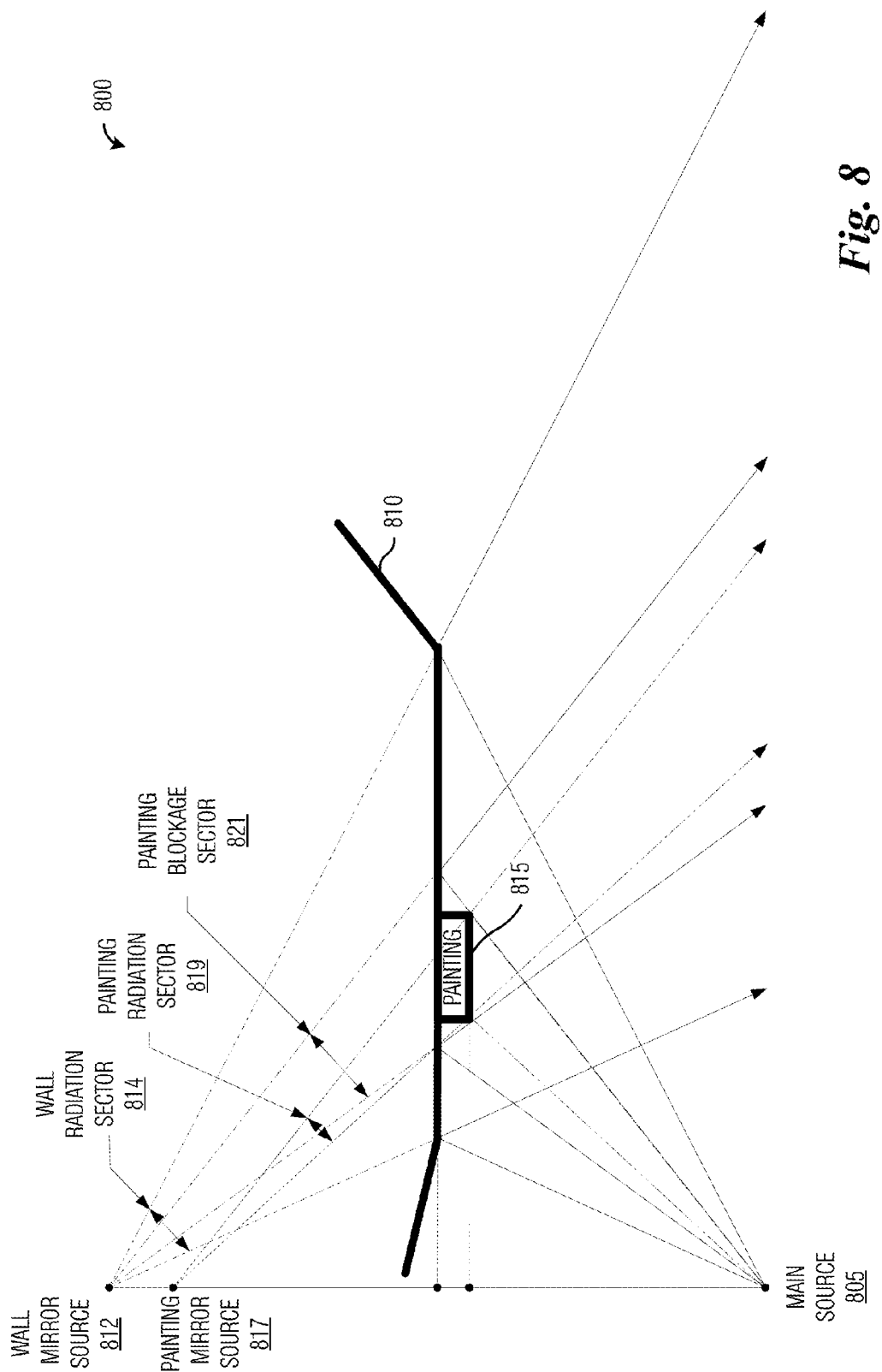
FIG. 8 illustrates an example communications system highlighting the modeling of a transmission following a secondary path with a blockage according to example embodiments described herein.

FIG. 8 illustrates an example communications system 800 highlighting the modeling of a transmission following a secondary path with a blockage. In communications system 800, a transmission originates at main source 805 and reflects off reflective surface 810. On reflective surface 810 is a painting 815. Painting 815 may not be as reflective as reflective surface 810 and may be viewed as a blockage. It is possible to model the transmissions reflecting off reflective surface 810 as originating at a wall mirror source 812 and transmissions reflecting off painting 815 as originating at painting mirror source 817. Wall mirror source 812 has a radiation sector 814 and painting mirror source 817 has radiation sector 819 and a blockage sector 821.

According to an example embodiment, channel estimation at a reception point is performed based on positions of main sources and mirror sources of transmissions received by the reception point. Channel estimation based on the positions of main sources and mirror sources of transmissions received by the reception point simplifies the channel estimation process by eliminating a need for the reception point to receive and process reference signals transmitted over the primary and secondary paths of the multipath between the main source of the transmission and each of the antennas in the antenna array of the reception point. Therefore, the channel estimation complexity is reduced. Additionally, the amount of information stored regarding the estimated channels based on the positions of the main sources and mirror sources of the transmissions is less than the amount of information stored when channel estimation is derived from the processing of received reference signals. Hence, the channel estimates storage and/or communications overhead (such as when the channel estimates are communicated) is reduced.

Figures 9A, 9B:
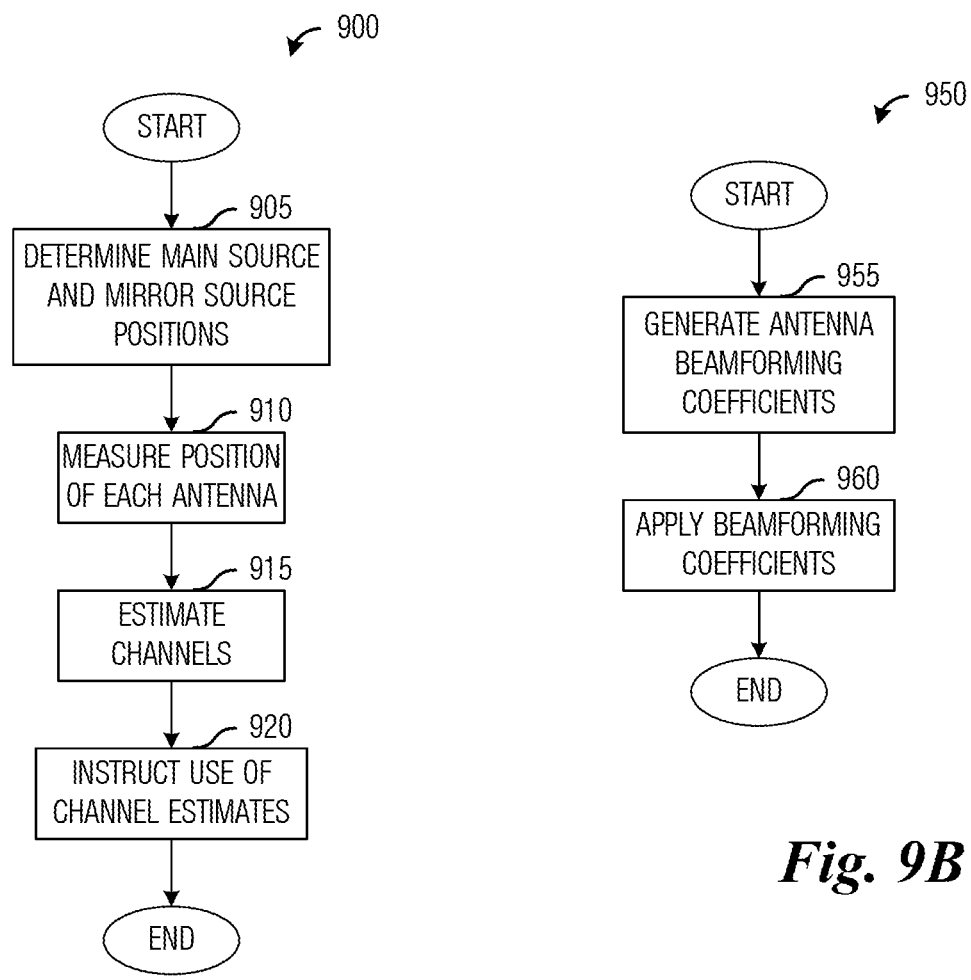
FIG. 9A illustrates a flow diagram of example operations occurring in a communications device with an antenna array according to example embodiments described herein.
FIG. 9B illustrates a flow diagram of example operations occurring in instructing the use of the channel estimates according to example embodiments described herein.

FIG. 9A illustrates a flow diagram of example operations 900 occurring in a communications device with an antenna array. Operations 900 may be indicative of operations occurring in a communications device, such as a transmission point and/or a reception point, with an antenna array as the communications device communicates with other communications devices.

Operations 900 begin with the communications device determining positions of main sources and/or mirror sources of transmissions received by the communications device (block 905). The positions of the main sources of the transmissions received by the communications device may be provided to the communications device by the main sources themselves. As an illustrative example, the main sources may include positioning units that use a positioning system, such as the Global Positioning System (GPS) or a positioning system that determines the position based on orthogonal reference signals, to determine the positions. The main sources may signal their positions to the communications device. Alternatively, the positions of the main sources of the transmissions may be provided by the communications system. The communications system may be able to determine the positions of the main sources from the transmissions of the main sources and provide the positions of the main sources to the communications device.

The communications device may determine positions of the mirror sources from the positions of the main sources and from physical environmental deployment (PED) information regarding the physical layout of the environment in which the communications device and the main sources are deployed. The PED information may include information about number and type (such as reflective or absorptive properties, penetration properties, and so on) of surfaces that reflect or absorb electromagnetic beams (such as walls, doors, ceilings, floors, and so forth), significant objects that reflect or absorb electromagnetic beams (such as large furniture pieces, large appliances, large mirrors, filing cabinets, computer servers, large televisions, and so on), less significant objects that reflect or absorb electromagnetic beams (such as small furniture pieces, art pieces, small appliances, small computers, displays, small televisions, printers, scanners, copiers, and the like), and the like. The PED information may also include information related to an extent of signal coverage since the extent of signal coverage has a role in determining which reception point sees which mirror source. A detailed discussion of an example technique for determining the positions of main sources and mirror sources is provided below.

The communications device measures the positions of the antennas in its antenna array (block 910). The antennas in the antenna array may include positioning units that are capable of determining the position of individual antennas autonomously. The positioning units may use a positioning system, such as GPS, to determine the positions of the antennas. The positioning units may use a positioning system that transmits orthogonal reference signals to determine the position of the antennas. A detailed discussion of example techniques for determining the positions of the antennas of the antenna array is provided in a co-assigned U.S. patent application, entitled "System and Method for Large Scale Multiple Input Multiple Output Beamforming", application Ser. No. 14/932,849, filed Nov. 4, 2015, which is hereby incorporated herein by reference.

The communications device estimates channels between the main sources and/or mirror sources and the antennas in the antenna array (block 915). The estimates of the channels may include estimates of primary channels (channels between main sources and the antennas in the antenna array) as well as estimates of secondary channels (channels between mirror sources and the antennas in the antenna array). As an illustrative example, the channel estimates are in the form of channel gains. In a general situation, the P antennas in the antenna array may be located at a set of coordinates $(x,y,z)_p$, where P is the number of antennas in the antenna array and p is the p-th antenna in the antenna array. Hence, the antennas in the antenna array do not necessarily have to be planar nor do they have to be uniformly spaced. In order to determine the coefficients for the antennas for a main source (or mirror source) at direction $(\alpha,\beta)$, where the direction $(\alpha,\beta)$ may be derived from the position of the main sources and mirror sources and the positions of the antennas in the antenna array. The coordinates of the target are expressible as $$x_r = R \cdot \cos(\alpha) \cdot \cos(\beta),$$

$$y_r = R \cdot \cos(\alpha) \cdot \sin(\beta),$$

$$z_r = R \cdot \sin(\alpha),$$

where R is at least an order of magnitude greater than $\sqrt{x_p^2 + y_p^2 + z_p^2}$ for any antenna p. It may be shown that the complex gain of each antenna p is expressible as $$H_p(\alpha, \beta) = \exp\left(j \cdot 2 \cdot \pi \cdot \frac{\sqrt{(x_p - x_T)^2 + (y_p - y_T)^2 + (z_p - z_T)^2}}{\lambda}\right),$$

which may be normalized as $$\overline{H}_p(\alpha, \beta) = \lim_{R \to \infty}\left(\frac{H_p(\alpha, \beta)}{H_0(\alpha, \beta)}\right).$$

It can also be shown that $\overline{H}_p(\alpha,\beta)$ converges to a projection of unit vector $(\alpha,\beta)$ upon vector $(x_p-x_0, y_p-y_0, z_p-z_0)$, which is expressible as $$\overline{H}_p(\alpha, \beta) = \exp\left(j \cdot 2 \cdot \pi \cdot \frac{\begin{array}{c}(x_p - x_0) \cdot \cos(\alpha) \cdot \cos(\beta) + (y_p - y_0) \cdot \\ \cos(\alpha) \cdot \sin(\beta) + (z_p - z_0) \cdot \sin(\alpha)\end{array}}{\lambda}\right).$$

Therefore, the channel for antenna m located at $(x_m, y_m, z_m)$ is expressible as $$H_m = \sum_{k=0}^{K-1} G_k \cdot \exp\left(j \cdot 2 \cdot \pi \cdot \frac{\begin{array}{c}x_m \cdot \cos(\alpha_k) \cdot \cos(\beta_k) + y_m \cdot \\ \cos(\alpha_k) \cdot \sin(\beta_k) + z_m \cdot \sin(\alpha_k)\end{array}}{\lambda}\right)$$

where $G_k$ is the complex amplitude of beam k and antenna 0 is located at reference point $(x_0, y_0, z_0)$.

A received sample of antenna m at time t is expressible as $$Y_m(t) = H_m \cdot D(t) + \text{Noise}_m(t),$$

where $\text{Noise}_m(t)$ is the thermal noise of antenna m at time t, and $D(t)$ is the data symbol at time t, which also can be re-written as $$Y_m(t) = \sum_{k=0}^{K-1} G_k \cdot \exp\left(j \cdot 2 \cdot \pi \cdot \frac{\begin{array}{c}x_m \cdot \cos(\alpha_k) \cdot \cos(\beta_k) + y_m \cdot \\ \cos(\alpha_k) \cdot \sin(\beta_k) + z_m \cdot \sin(\alpha_k)\end{array}}{\lambda}\right) \cdot D(t) + \text{Noise}_m(t).$$

Using multi-beam maximum ratio combining (MRC) decoding, an output at time t of a MRC decoder is expressible as $$R(t) = \frac{1}{\sum_{m=0}^{M-1}|H_m|^2} \cdot \sum_{m=0}^{M-1} \text{conj}(H_m) \cdot Y_m(t) = D(t) + \text{Noise}(t),$$

which also can be re-written as $$R(t) = \frac{1}{\sum_{k=0}^{K-1} G_k^2} \cdot \sum_{k=0}^{K-1} \text{conj}(G_k) \cdot R_k(t, \alpha_k, \beta_k),$$

where $R_k(t, \alpha_k, \beta_k)$ is the MRC decoder output for beam k at time t, which is expressible as $$R_k(t, \alpha_k, \beta_k) = \frac{1}{M} \cdot \sum_{m=0}^{M-1} \exp\left(-j \cdot 2 \cdot \pi \cdot \frac{\begin{array}{c}x_m \cdot \cos(\alpha_k) \cdot \cos(\beta_k) + y_m \cdot \\ \cos(\alpha_k) \cdot \sin(\beta_k) + z_m \cdot \sin(\alpha_k)\end{array}}{\lambda}\right) \cdot Y_m(t).$$

Utilizing the expressions for $R_k(t, \alpha_k, \beta_k)$ and $Y_m(t)$ above, and since the beams are orthogonal to each other, it may be shown that the MRC decoder output for beam k at time t is approximately equal to the data symbol at time t multiplied by the complex amplitude of beam k: $R_k(t, \alpha_k, \beta_k) \approx G_k \cdot D(t)$. Suppose that the pilot sequence of length N is known (i.e., $D(t)=PLT(t)$ For $(0 \le t < N)$), then the Least Mean Squared (LMS) complex gain estimation is expressible as $\hat{G}_k = \frac{1}{N} \cdot \sum_{n=0}^{N-1} R_k(n, \alpha_k, \beta_k) \cdot PLT(n) \approx G_k.$ The expression for $H_p(\alpha,\beta)$ and $\overline{H}_p(\alpha,\beta)$ above shows that it is possible to tune the antenna array with antennas at coordinates $(x,y,z)_p$ in space $(x,y,z)$ to transmit and/or receive signals to and/or from direction $(\alpha,\beta)$ may be configured with coefficients that match the complex gain $H^*_p(\alpha,\beta)$. The communications device instructs use of the channel estimates (block 920). Instructing use of the channel estimates may include storing the channel estimates, indicating the channel estimates to other communications devices, providing the channel estimates or values derived from the channel estimates to the antenna array, deriving information (such as antenna beamforming coefficients) from the channel estimates, and so on.

FIG. 9B illustrates a flow diagram of example operations 950 occurring in instructing the use of the channel estimates. Operations 950 may be indicative of operations occurring in a communications device, such as a transmission point and/or a reception point, with an antenna array as the communications device instructs the use of the channel estimates.

The communications device generates the beamforming coefficients for the antennas in the antenna array in accordance with the channel estimates (block 955). The communications device applies the beamforming coefficients (block 960). The communications device may provide the beamforming coefficients to corresponding antennas in the antenna array. The beamforming coefficients.

According to an example embodiment, the positions of the mirror sources are determined from positional information of the main sources and PED information. The positions of the mirror sources may be determined from the positional information of the main sources and the PED information using simple geometric relationships. If there are multiple main sources, the positions of mirror sources for each main source may be separately determined.

Figure 10:
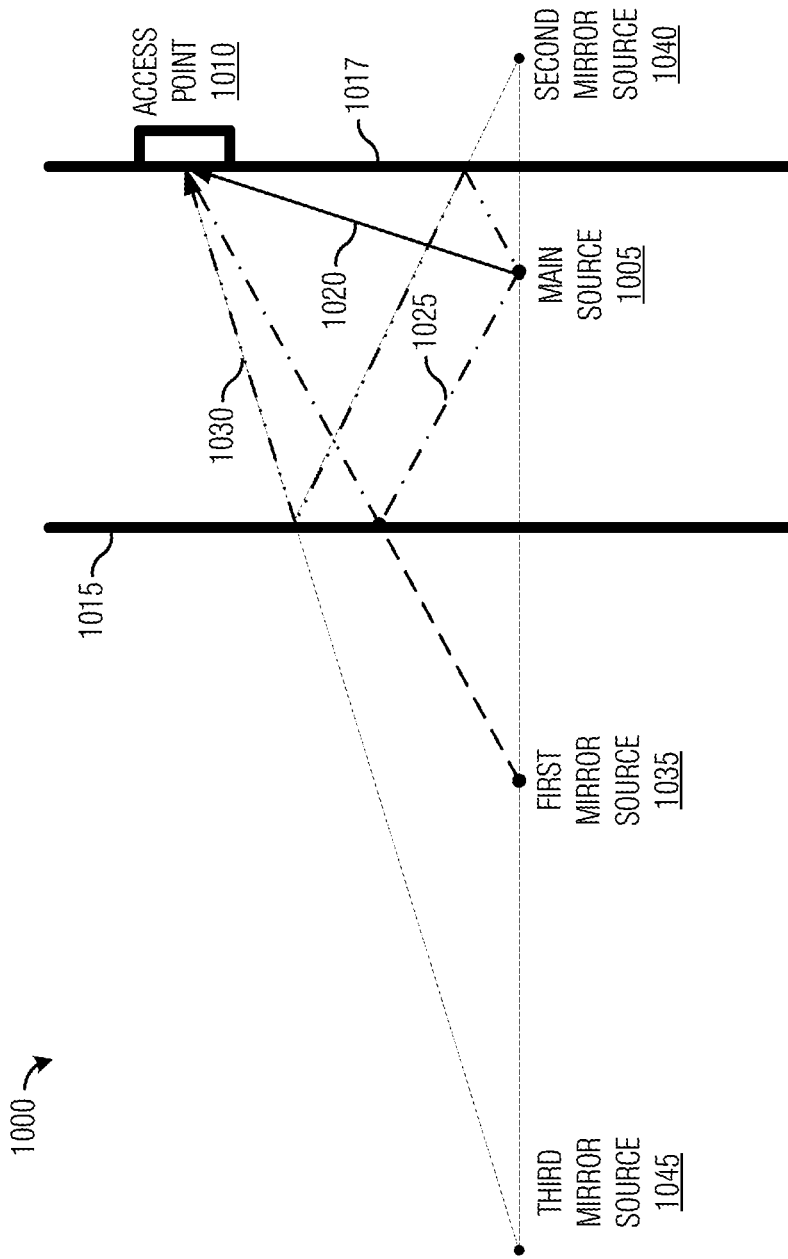
FIG. 10 illustrates an example communications system, highlighting primary and secondary paths and associated mirror sources according to example embodiments described herein.

FIG. 10 illustrates an example communications system 1000, highlighting primary and secondary paths and associated mirror sources. Communications system 1000 includes communicating devices, main source 1005 and an AP 1010. As shown in FIG. 10, main source 1005 is making an uplink transmission to AP 1010. In other words, main source 1005 is the transmission point and AP 1010 is the reception point. Communications system 1000 is deployed in between a first wall 1015 and a second wall 1017. As an example, communications system 1000 is deployed indoors.

When main source 1005 sends a transmission to AP 1010, the transmission may follow a primary path 1020. The transmission may also follow several secondary paths, such as first secondary path 1025 where the transmission reflects off first wall 1015 before arriving at AP 1010, or a second secondary path 1030 where the transmission reflects off second wall 1017 and first wall 1015 before arriving at AP 1010. First secondary path 1025 reflects off a single wall, so there is a single mirror source associated with first secondary path 1025, which is shown in FIG. 10 as first reflected source 1035. Second secondary path 1030 reflects off two walls, so there are two mirror sources associated with second secondary path 1030, which are shown in FIG. 10 as second mirror source 1040 and third mirror source 1045.

Figure 11:
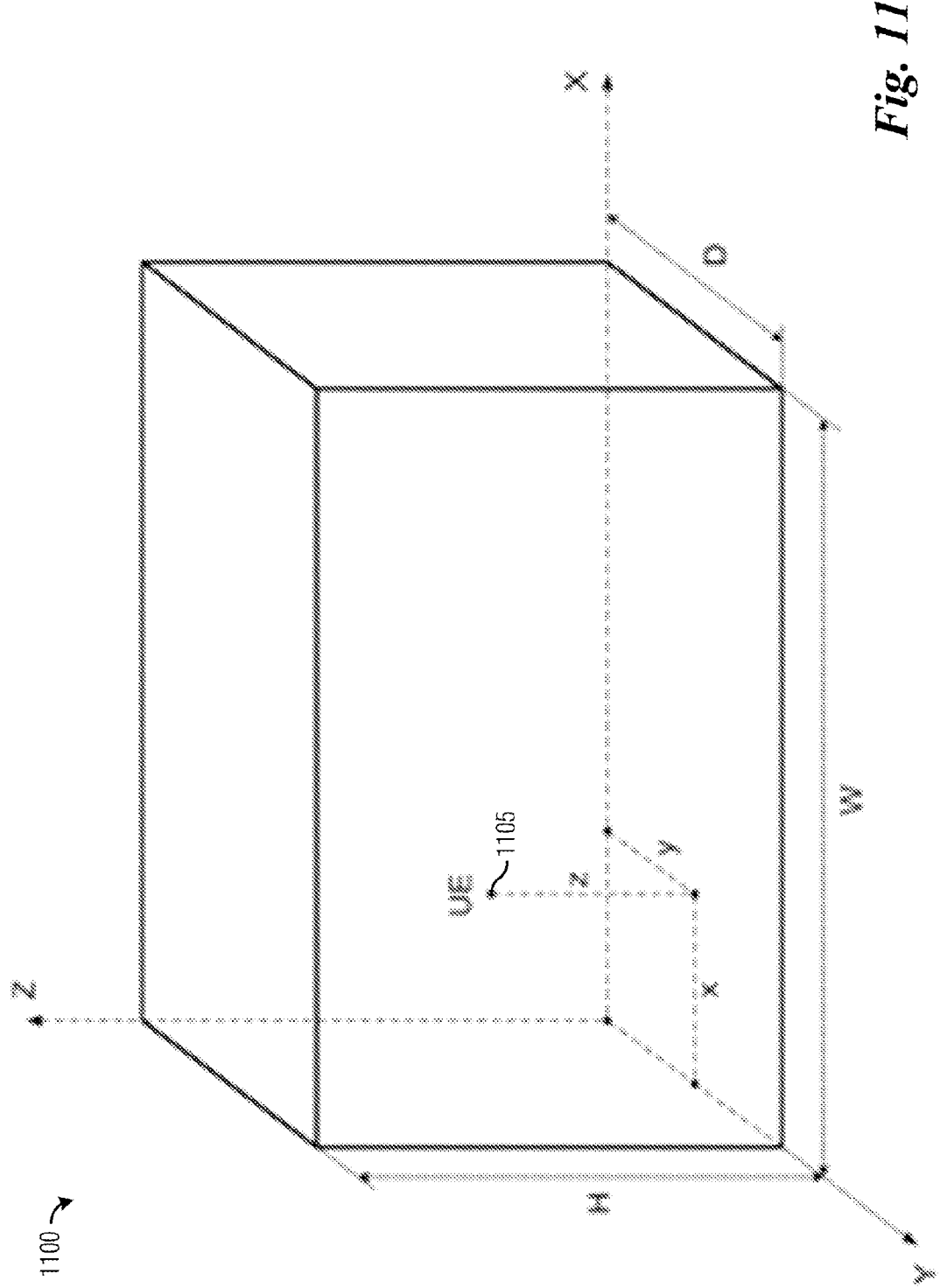
FIG. 11 illustrates a diagram of a model for a rectangular room according to example embodiments described herein.

FIG. 11 illustrates a diagram of a model for a rectangular room 1100. As shown in FIG. 11, rectangular room 1100 has dimensions (W,D,H). Interior to rectangular room 1100 is a UE 1105 located at coordinates ($x_0$, $y_0$, $z_0$). UE 1105 is considered to be the main source and as stated previously, is located at coordinates ($x_0$, $y_0$, $z_0$).

It can be shown through basic geometric relationships that there are 6 mirror sources that correspond to one reflection secondary paths (these particular mirror sources may be referred to as first-order reflection mirror sources). The 6 first-order reflection mirror sources are located at coordinates:

$$(-x_0, y_0, z_0), (2 \cdot W - x_0, y_0, z_0)$$

$$(x_0, -y_0, z_0), (x_0, 2 \cdot D - y_0, z_0)$$

$$(x_0, y_0, -z_0), (x_0, y_0, 2 \cdot H - z_0).$$

Furthermore, there are $6 \cdot (6-1)$ second-order reflection mirror sources, which are mirror sources corresponding to second-order reflections of the secondary paths. Additionally, there are $6 \cdot (6-1)^2$ third-order reflection mirror sources, which are mirror sources corresponding to third-order reflections of the secondary paths. In general, there are $6 \cdot (6-1)^{(n-1)}$ n-th-order reflection mirror sources. In other words, the main source has 6 mirror sources (corresponding to the 4 walls, the ceiling, and the floor of rectangular room 1100) and each of the mirror sources has (6−1=5) mirror sources of their own, and so on.

Figure 12:
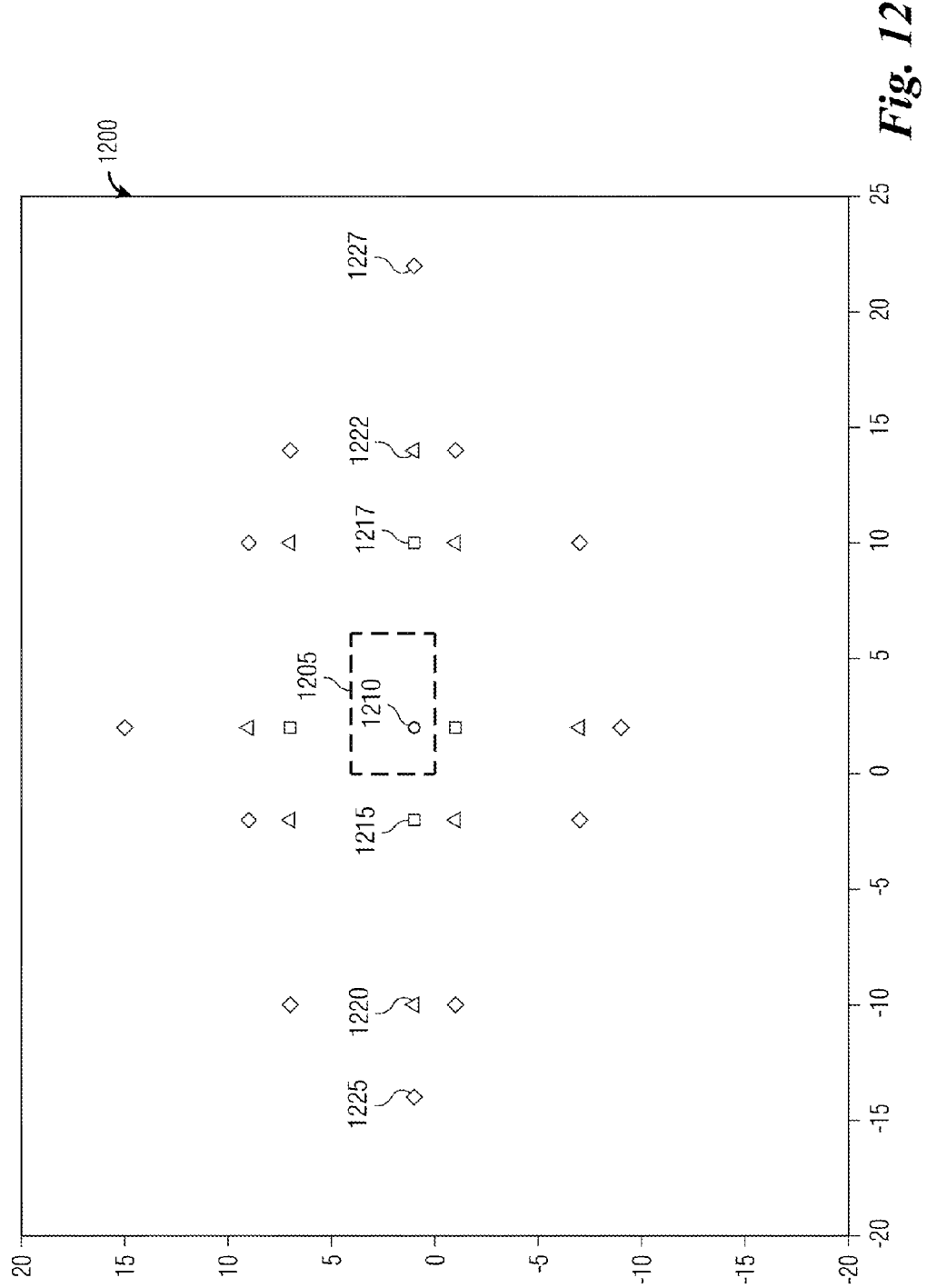
FIG. 12 illustrates a two-dimensional view of rectangular room, highlighting the positions of main sources and mirror sources according to example embodiments described herein.

FIG. 12 illustrates a two-dimensional view 1200 of rectangular room 1205, highlighting the positions of main sources and mirror sources. The two-dimensional view of rectangular room 1205 may be a top-down or bottom-up view of rectangular room 1205. Alternatively, if rectangular room 1205 had a ceiling and a floor formed from radiation absorbing material, the rectangular room 1205 may be viewed as a two-dimensional room.

As shown in FIG. 12, a main source 1210 is positioned inside rectangular room 1205. Main source 1210 has 4 first-order reflection mirror sources, such as first-order reflection mirror sources 1215 and 1217, and 8 second-order reflection mirror sources, such as second-order reflection mirror sources 1220 and 1222, and 12 third-order reflection mirror sources, such as third-order reflection mirror sources 1225 and 1227.

A portion of the energy present in the electromagnetic beam is absorbed by the reflection surface. Furthermore, there are also propagation losses. Therefore, the energy of the mirror sources decrease as the number of reflections increase. Eventually, the energy of the higher order mirror sources approach zero. Hence, the number of significant mirror sources is finite. As an illustrative example, a number of significant mirror sources is equal to the number of mirror sources wherein an accumulation of the energy levels of the mirror sources meets a threshold (e.g., 90%) of the total signal energy.

According to an example embodiment, information relating communications devices (e.g., access points) to main sources and/or mirror sources are generated to simplify communications device and source relationships. As an illustrative example, information relating communications devices to main sources and/or mirror sources are presented in tabular form with a first value indicating that the communications device can receive from the main source and/or mirror source and a second value indicating that the communications device cannot receive from the main source and/or mirror source.

Figure 13:
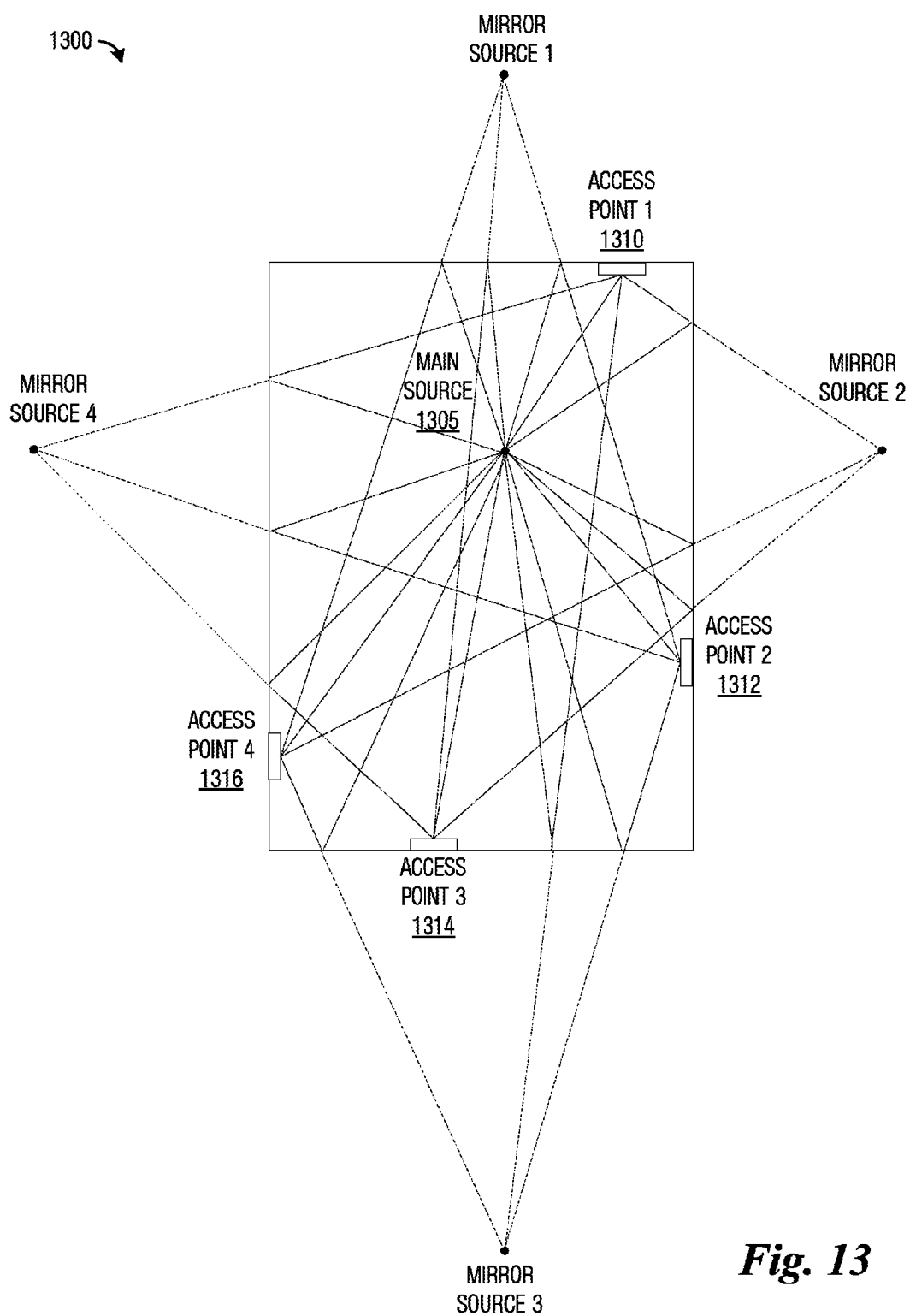
FIG. 13 illustrates a first example deployment of communications system according to example embodiments described herein.

FIG. 13 illustrates a first example deployment of communications system 1300. Communications system 1300 is deployed in an ideal cubic shaped room with radiation absorbing materials in the ceiling and floor of the room. A main source 1305 is deployed in the room and four access points (access point 1 1310, access point 2 1312, access point 3 1314, and access point 4 1316) are positioned along the walls of the room. Table 1 provides information relating communications devices (APs) to main sources and/or mirror sources in a deployment as shown in FIG. 13, where a "+" indicates that an AP is able to receive a signal from main source 1305 or a mirror source and a "−" indicates that an AP is unable to receive a signal from main source 1305 or a mirror source. Additionally, only first reflection mirror sources are considered.

Figure 14A:
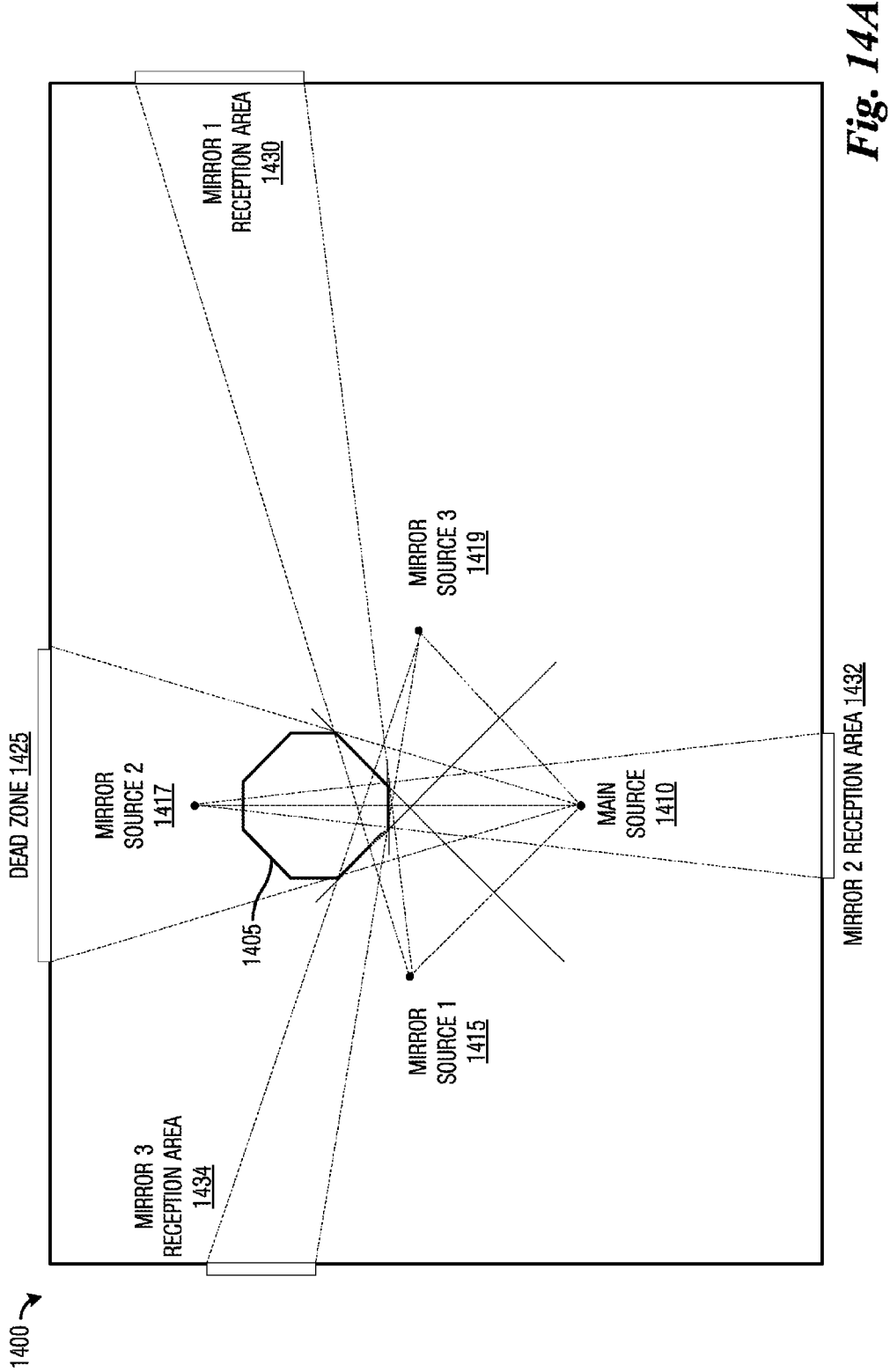
FIG. 14A illustrates a second example deployment of communications system according to example embodiments described herein.
Figure 14B:
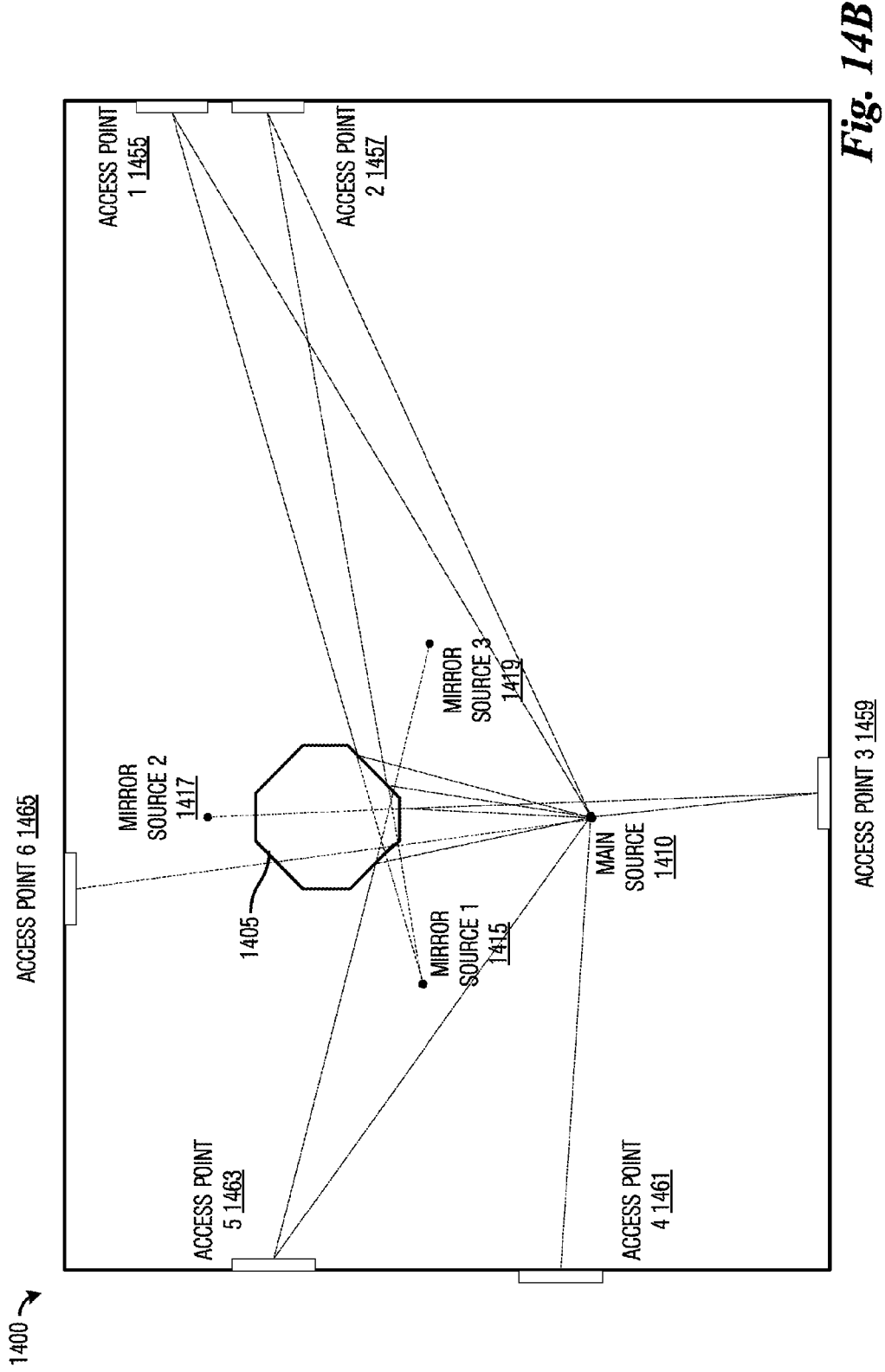
FIG. 14B illustrates access point deployment in communications system of FIG. 14A according to example embodiments described herein.

FIG. 14A illustrates a second example deployment of communications system 1400. Communications system 1400 is deployed in an ideal rectangular shaped room with radiation absorbing materials in the ceiling, floor, and walls. The room includes a reflective column 1405. Therefore the only reflections are coming from reflective column 1405. A main source 1410 is deployed in the room and six access points (not shown) are positioned along the walls of the room. Reflective column 1405 results in a dead zone 1425. However, reflective column 1405 also results in reflective areas, such as mirror 1 reflective area 1430 (corresponding to mirror source 1 1415), mirror 2 reflective area 1432 (corresponding to mirror source 2 1417), and mirror 3 reflective area 1434 (corresponding to mirror source 3 1419). FIG. 14B illustrates access point deployment in communications system 1400 of FIG. 14A. Communications system 1400 includes 6 access points (access point 1 1455, access point 2 1457, access point 3 1459, access point 4 1461, access point 5 1463, and access point 6 1465) positioned along the walls of the room. Table 2 provides information relating communications devices to main sources and/or mirror sources in a deployment as shown in FIG. 14B, where a "+" indicates that an AP is able to receive a signal from main source 1410 or a mirror source and a "−" indicates that an AP is unable to receive a signal from main source 1410 or a mirror source. Only first reflection mirror sources are considered.

TABLE 1

APs and sources in ideal cubic room.

| | AP 1 | AP 2 | AP 3 | AP 4 |
|---|---|---|---|---|
| Main source | + | + | + | + |
| Mirror Source # 1 | − | + | + | + |
| Mirror Source # 2 | + | − | + | + |
| Mirror Source # 3 | + | + | − | + |
| Mirror Source # 4 | + | + | + | − |

TABLE 2

APs and sources in ideal cubic room with reflective column.

| | AP 1 | AP 2 | AP 3 | AP 4 | AP 5 | AP 6 |
|---|---|---|---|---|---|---|
| Main Source | + | + | + | + | + | − |
| Mirror Source # 1 | + | + | − | − | − | − |
| Mirror Source # 2 | − | − | + | − | − | − |
| Mirror Source # 3 | − | − | − | − | + | − |

Figure 15:
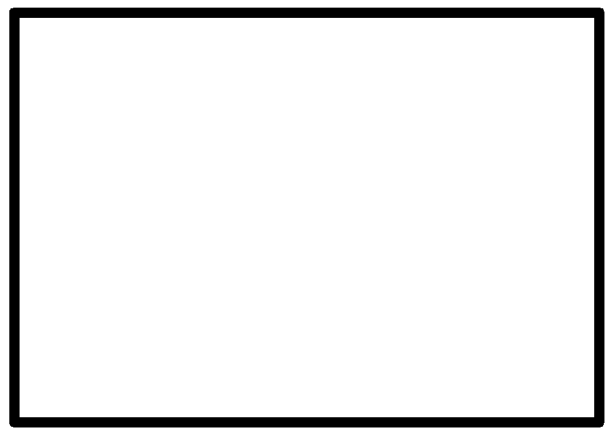
FIG. 15 illustrates an example low entropy environment according to example embodiments described herein.
Figure 16:
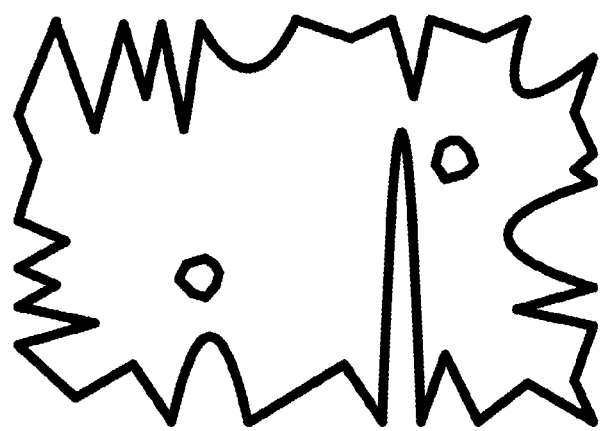
FIG. 16 illustrates an example high entropy environment according to example embodiments described herein.

In general, a communications device may be able to only see its own set of main sources and mirror source. Furthermore, some main sources and mirror sources are visible by many communications devices. The main sources and mirror sources visible by communications devices are dependent on the environment, such as the number of flat reflective surfaces and their dimensions. If there are a small number of large flat surfaces, then the environment may be represented as a superposition of a limited number of wide sector radiation main sources and mirror sources. Such an environment may be referred to as a low entropy environment. FIG. 15 illustrates an example low entropy environment 1500. If the environment includes a large number of small flat surfaces, then the environment may be represented as a superposition of a large number of narrow sector radiation main sources and mirror sources. Such an environment may be referred to as a high entropy environment. FIG. 16 illustrates an example high entropy environment 1600. High entropy environment has a large number of narrow sector radiation main sources and mirror sources.

According to an example embodiment, in a low entropy environment, many communications devices will be able to see many common main sources and mirror sources and a coordinated approach yields significant benefits by Reducing the number of channel parameters that are estimated. Instead of independent estimation of each antenna channel, a limited number of main sources and mirror sources may be estimated. The amount of channel information that must be exchanged between different communications devices is reduced.

The quality of the estimation is increased because the multiple communications devices can mutually estimate the main sources and mirror sources.

In a high entropy environment, where each communications device has a unique set of main sources and mirror sources, the coordinate approach may converge to the conventional independent estimation technique. However, estimation performance is not degraded so nothing is lost.

Figure 17:
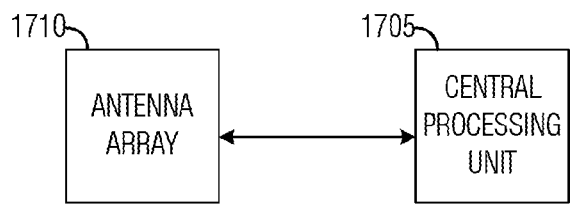
FIG. 17 illustrates an example MIMO communications device, highlighting the architecture of MIMO communications device according to example embodiments described herein.

FIG. 17 illustrates an example MIMO communications device 1700, highlighting the architecture of MIMO communications device 1700. MIMO communications device 1700 includes a central processing unit 1705 and an array of antennas 1710 coupled to central processing unit 1705. Array of antennas 1710 may include any number of antennas, but for large scale MIMO implementations, it is expected that array of antennas 1710 includes on the order of hundreds, thousands, tens of thousands, or more antennas. Central processing unit 1705 may be a single processor or a multi-processor system. Not shown in FIG. 17 are ancillary circuitry such as memories, network interfaces, user interfaces, power supplies, and so forth.

Figure 18:
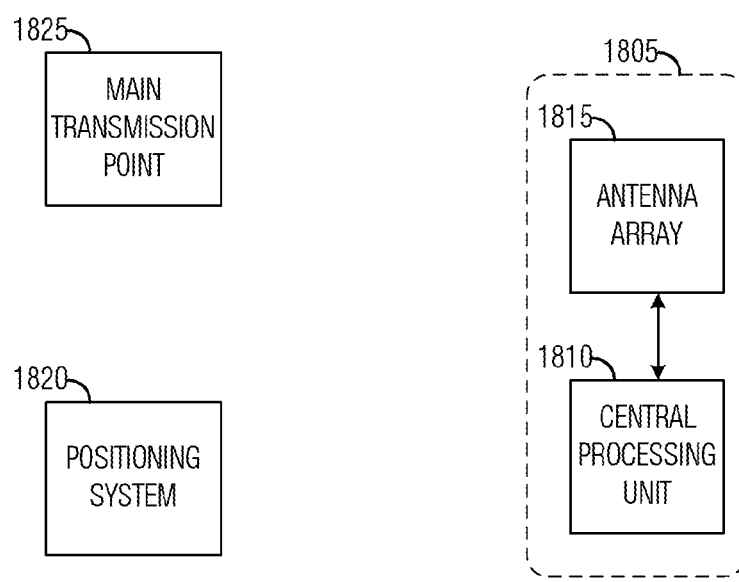
FIG. 18 illustrates an example large scale MIMO communications system according to example embodiments described herein.

FIG. 18 illustrates an example large scale MIMO communications system 1800. Communications system 1800 includes a large scale MIMO communications device 1805 with a central processing unit 1810 and an antenna array 1815. Antennas of antenna array 1815 may be arranged in a one-, two-, or three-dimensional array with regular or irregular spacing between antennas. Communications system 1800 also includes a positioning system 1820 that is configured to transmit orthogonal reference signals to assist in determining position information of antennas of antenna array 1815. Communications system 1800 also includes a main transmission source 1825 communicating with large scale MIMO communications device 1805.

Figure 19:
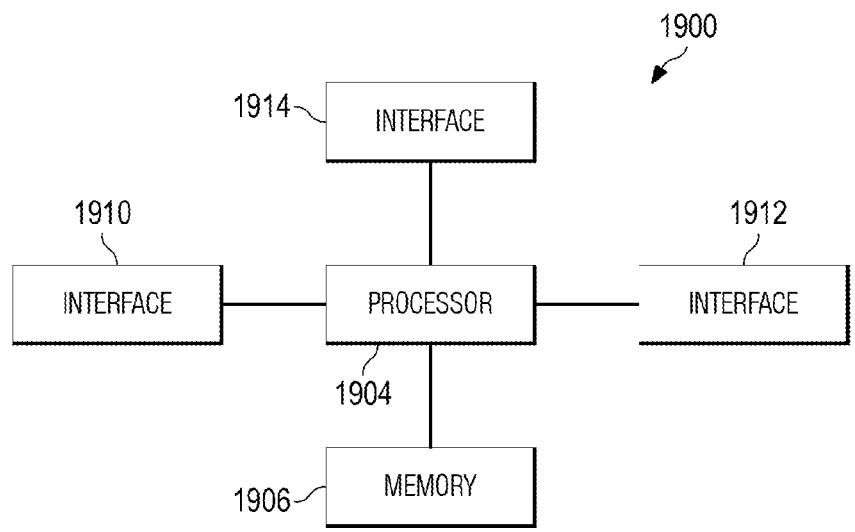
FIG. 19 illustrates a block diagram of an embodiment processing system for performing methods described herein.

FIG. 19 illustrates a block diagram of an embodiment processing system 1900 for performing methods described herein, which may be installed in a host device. As shown, the processing system 1900 includes a processor 1904, a memory 1906, and interfaces 1910-1914, which may (or may not) be arranged as shown in FIG. 19. The processor 1904 may be any component or collection of components adapted to perform computations and/or other processing related tasks, and the memory 1906 may be any component or collection of components adapted to store programming and/or instructions for execution by the processor 1904. In an embodiment, the memory 1906 includes a non-transitory computer readable medium. The interfaces 1910, 1912, 1914 may be any component or collection of components that allow the processing system 1900 to communicate with other devices/components and/or a user. For example, one or more of the interfaces 1910, 1912, 1914 may be adapted to communicate data, control, or management messages from the processor 1904 to applications installed on the host device and/or a remote device. As another example, one or more of the interfaces 1910, 1912, 1914 may be adapted to allow a user or user device (e.g., personal computer (PC), etc.) to interact/communicate with the processing system 1900. The processing system 1900 may include additional components not depicted in FIG. 19, such as long term storage (e.g., non-volatile memory, etc.).

In some embodiments, the processing system 1900 is included in a network device that is accessing, or part otherwise of, a telecommunications network. In one example, the processing system 1900 is in a network-side device in a wireless or wireline telecommunications network, such as a base station, a relay station, a scheduler, a controller, a gateway, a router, an applications server, or any other device in the telecommunications network. In other embodiments, the processing system 1900 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 20:
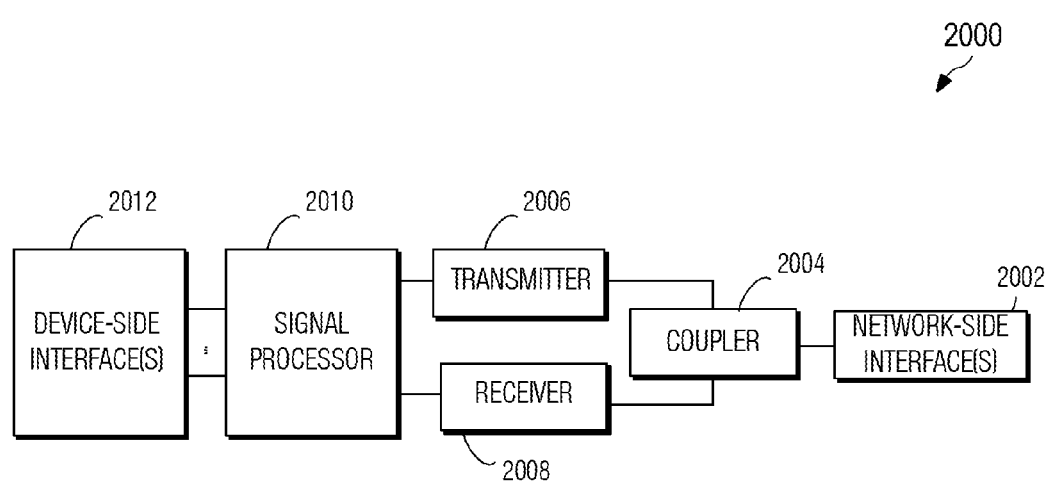
FIG. 20 illustrates a block diagram of a transceiver adapted to transmit and receive signaling over a telecommunications network according to example embodiments described herein.

In some embodiments, one or more of the interfaces 1910, 1912, 1914 connects the processing system 1900 to a transceiver adapted to transmit and receive signaling over the telecommunications network. FIG. 20 illustrates a block diagram of a transceiver 2000 adapted to transmit and receive signaling over a telecommunications network. The transceiver 2000 may be installed in a host device. As shown, the transceiver 2000 comprises a network-side interface 2002, a coupler 2004, a transmitter 2006, a receiver 2008, a signal processor 2010, and a device-side interface 2012. The network-side interface 2002 may include any component or collection of components adapted to transmit or receive signaling over a wireless or wireline telecommunications network. The coupler 2004 may include any component or collection of components adapted to facilitate bi-directional communication over the network-side interface 2002. The transmitter 2006 may include any component or collection of components (e.g., up-converter, power amplifier, etc.) adapted to convert a baseband signal into a modulated carrier signal suitable for transmission over the network-side interface 2002. The receiver 2008 may include any component or collection of components (e.g., down-converter, low noise amplifier, etc.) adapted to convert a carrier signal received over the network-side interface 2002 into a baseband signal. The signal processor 2010 may include any component or collection of components adapted to convert a baseband signal into a data signal suitable for communication over the device-side interface(s) 2012, or vice-versa. The device-side interface(s) 2012 may include any component or collection of components adapted to communicate data-signals between the signal processor 2010 and components within the host device (e.g., the processing system 1900, local area network (LAN) ports, etc.).

The transceiver 2000 may transmit and receive signaling over any type of communications medium. In some embodiments, the transceiver 2000 transmits and receives signaling over a wireless medium. For example, the transceiver 2000 may be a wireless transceiver adapted to communicate in accordance with a wireless telecommunications protocol, such as a cellular protocol (e.g., long-term evolution (LTE), etc.), a wireless local area network (WLAN) protocol (e.g., WiFi, etc.), or any other type of wireless protocol (e.g., Bluetooth, near field communication (NFC), etc.). In such embodiments, the network-side interface 2002 comprises one or more antenna/radiating elements. For example, the network-side interface 2002 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 2000 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

Although the present disclosure and its advantages have been described in detail, it should be understood that various changes, substitutions and alterations can be made herein without departing from the spirit and scope of the disclosure as defined by the appended claims.

What is claimed is:

1. A method for channel estimation, the method comprising:
    determining, by a communications device, position information of a main transmission point with a primary transmission path to the communications device and of at least one mirror transmission point associated with the main transmission point by at least one secondary transmission path between the main transmission point and the communications device, wherein the at least one mirror transmission point is a point on a line extrapolated along a reflected portion of the at least one secondary transmission path to an opposite side of a reflecting surface from the main transmission point;
    estimating, by the communications device, a primary channel between the main transmission point and the communications device and at least one secondary channel between the at least one mirror transmission point and the communications device in accordance with the position information of the main transmission point and of the at least one mirror transmission point and position information of antennas in an antenna array of the communications device; and
    instructing, by the communications device, use of the estimated primary channel and the at least one estimated secondary channel, wherein instructing the use of the estimated primary channel and the at least one estimated secondary channel comprises:
        generating beamforming coefficients in accordance with the estimated primary channel and the at least one estimated secondary channel and the position information of the antennas in the antenna array; and
        providing the beamforming coefficients to the antennas in the antenna array.

2. The method of claim 1, wherein determining the position information of the main transmission point comprises receiving the position information of the main transmission point in a message.

3. The method of claim 1, wherein determining the position information of the main transmission point comprises performing an acquisition procedure to determine the position information of the main transmission point.

4. The method of claim 1, wherein determining the position information of the at least one mirror transmission point comprises deriving the position information of the at least one mirror transmission point in accordance with the position information of the main transmission point and physical environmental deployment (PED) information regarding a physical layout of a communications system including the communications device and the main transmission point.

5. The method of claim 4, wherein the PED information comprises information about at least one of a number, a location, a type, a shape, a reflection property, a penetration property, and an orientation of surfaces that reflect transmissions, and a number, a location, a type, a shape, an absorption property, a penetration property, and an orientation of surfaces that absorb transmissions.

6. The method of claim 1, wherein instructing the use of the estimated primary channel and the at least one estimated secondary channel comprises at least one of saving information regarding the estimated primary channel and the at least one estimated secondary channel, and signaling an indication of the estimated primary channel and the at least one estimated secondary channel.

7. The method of claim 1, wherein the communications device is in a near field of the transmission point.

8. The method of claim 1, further comprising:
    adjusting the estimated primary channel and the at least one estimated secondary channel in accordance with estimates of at least one other primary channel and at least one other secondary channel from other communications devices.

9. The method of claim 8, further comprising:
    exchanging the estimated primary channel and the at least one estimated secondary channel with the other communications devices.

10. The method of claim 9, further comprising:
    storing the estimated primary channel and the at least one estimated secondary channel in a database.

11. A multiple input multiple output (MIMO) communications device comprising:
    an antenna array;
    a processor; and
    a computer readable storage medium storing programming for execution by the processor, the programming including instructions configuring the MIMO communications device to:
        determine position information of a main transmission point with a primary transmission path to the MIMO communications device and of at least one mirror transmission point associated with the main transmission point by at least one secondary transmission path between the main transmission point and the MIMO communications device, wherein the at least one mirror transmission point is a point on a line extrapolated along a reflected portion of the at least one secondary transmission path to an opposite side of a reflecting surface from the main transmission point, estimate a primary channel between the transmission point and the MIMO communications device and at least one secondary channel between the at least one mirror transmission point and the MIMO communications device in accordance with the position information of the main transmission point and of the at least one mirror transmission point and position information of antennas in the antenna array, and instruct use of the estimated primary channel and the at least one estimated secondary channel, wherein the programming includes instructions to generate beamforming coefficients in accordance with the estimated primary channel and the at least one estimated secondary channel and the position information of the antennas in the antenna array, and provide the beamforming coefficients to the antennas in the antenna array.

12. The MIMO communications device of claim 11, wherein the programming includes instructions to receive the position information of the main transmission point in a message.

13. The MIMO communications device of claim 11, wherein the programming includes instructions to perform an acquisition procedure to determine the position information of the main transmission point.

14. The MIMO communications device of claim 11, wherein the programming includes instructions to derive the position information of the at least one mirror transmission point in accordance with the position information of the main transmission point and physical environmental deployment (PED) information regarding a physical layout of a communications system including the communications device and the main transmission point.

15. The MIMO communications device of claim 11, wherein the programming includes instructions to at least one of save information regarding the estimated primary channel and the at least one estimated secondary channel, and signal an indication of the estimated primary channel and the at least one estimated secondary channel.

16. The MIMO communications device of claim 11, wherein the MIMO communications device is a large scale MIMO communications device.

17. The MIMO communications device of claim 11, wherein the programming includes instructions to adjust the estimated primary channel and the at least one estimated secondary channel in accordance with estimates of at least one other primary channel and at least one other secondary channel from other communications devices.

18. A multiple input multiple output (MIMO) communications system comprising:

a main transmission point;

a positioning system configured to transmit orthogonal reference signals; and a MIMO communications device including
an antenna array comprising a plurality of antenna units,
a processor, and
a computer readable storage medium storing programming for execution by the processor, the programming including instructions configuring the MIMO communications device to:
determining positional information of antennas of the antenna array in accordance with the orthogonal reference signals transmitted by the positioning system,
determine position information of the main transmission point with a primary transmission path to the MIMO communications device and of at least one mirror transmission point associated with the main transmission point by at least one secondary transmission path between the main transmission point and the MIMO communications device,
estimate a primary channel between the main transmission point and the MIMO communications device and at least one secondary channel between the at least one mirror transmission point and the MIMO communications device in accordance with the position information of the main transmission point and of the at least one mirror transmission point and the position information of antennas in the antenna array,
generate beamforming coefficients in accordance with the estimated primary channel and the at least one estimated secondary channel and the position information of the antennas in the antenna array,
provide the beamforming coefficients to the antennas in the antenna array, and
communicate with the main transmission point and of the at least one mirror transmission point using the antenna array.

19. The MIMO communications system of claim 18, wherein the positioning system comprises a plurality of reference signal generators, each reference signal generator configured to transmit an orthogonal reference signal.

20. The MIMO communications system of claim 18, wherein the antenna array is a non-planar antenna array with irregular antenna unit spacing.

21. The MIMO communications system of claim 18, wherein the programming includes instructions to receive the position information of the transmission point in a message.

22. The MIMO communications system of claim 18, wherein the programming includes instructions to derive the position information of the at least one mirror transmission point in accordance with the position information of the transmission point and physical environmental deployment (PED) information regarding a physical layout of a communications system including the main transmission point and the MIMO communications device.

23. The MIMO communications system of claim 18, wherein the programming includes instructions to provide the beamforming coefficients associated with an antenna to the antenna.

* * * * *